United States Patent
Kawakami

(10) Patent No.: US 10,031,871 B2
(45) Date of Patent: Jul. 24, 2018

(54) DMA CONTROL DEVICE, MICRO CONTROL UNIT, AND DMA CONTROL METHOD

(71) Applicant: FUJITSU LIMITED, Kawasaki-shi, Kanagawa (JP)

(72) Inventor: Kentaro Kawakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 263 days.

(21) Appl. No.: 14/959,572

(22) Filed: Dec. 4, 2015

(65) Prior Publication Data

US 2016/0210252 A1    Jul. 21, 2016

(30) Foreign Application Priority Data

Jan. 20, 2015   (JP) ................................. 2015-008626

(51) Int. Cl.
  *G06F 13/28*   (2006.01)
  *G06F 13/16*   (2006.01)
  *G06F 13/40*   (2006.01)

(52) U.S. Cl.
  CPC ............. *G06F 13/28* (2013.01); *G06F 13/16* (2013.01); *G06F 13/4063* (2013.01); *Y02D 10/14* (2018.01); *Y02D 10/151* (2018.01)

(58) Field of Classification Search
  CPC ....... G06F 13/28; G06F 13/16; G06F 13/4063
  See application file for complete search history.

(56) References Cited

U.S. PATENT DOCUMENTS

| | | | | |
|---|---|---|---|---|
| 5,708,849 A * | 1/1998 | Coke | ...................... | G06F 13/28 710/22 |
| 5,822,568 A * | 10/1998 | Swanstrom | ............. | G06F 13/28 703/24 |
| 6,732,198 B1 * | 5/2004 | Johnson | ............... | G06F 9/30032 710/20 |
| 6,912,687 B1 * | 6/2005 | Gates | ................... | G06F 11/1076 714/6.2 |
| 2003/0084212 A1 * | 5/2003 | Butterfield | ............... | G06F 13/28 710/22 |
| 2005/0027907 A1 * | 2/2005 | Lee | ...................... | H04N 1/00236 710/58 |
| 2007/0162643 A1 * | 7/2007 | Tousek | ................ | G06F 13/1642 710/22 |

FOREIGN PATENT DOCUMENTS

| | | |
|---|---|---|
| JP | 6-60013 | 3/1994 |
| JP | 2003-58491 | 2/2003 |
| JP | 2011-70372 | 4/2011 |

* cited by examiner

*Primary Examiner* — Glenn A Auve
(74) *Attorney, Agent, or Firm* — Staas & Halsey LLP

(57) ABSTRACT

A direct memory access (DMA) control device including: a basic-function setting register used to perform DMA operation; and a scatter-gather setting register in which a value indicating that a task is executed through setting of a directly defined value for data to be written to the basic-function setting register without reading the data from a memory through a bus is set.

15 Claims, 27 Drawing Sheets

FIG. 6

| VALUE OF SETTING BITS | DETAILS OF OPERATION |
|---|---|
| 0 | GENERAL SCATTER-GATHER OPERATION |
| 1 | SPECIFY DMAC_CONFIG = 0x0000_0001, AND DOES NOT READ SETTING VALUE FOR DMAC_CONFIG FROM MEMORY |
| 2 | SPECIFY IMMEDIATE VALUE FOR VALUE TO BE WRITTEN, AND DOES NOT READ COPY-SOURCE DATA |
| 3 | SPECIFY DMAC_CONFIG = 0x0000_0001 AND IMMEDIATE VALUE FOR VALUE TO BE WRITTEN |

FIG. 11

| VALUE OF SETTING BITS | NUMBER OF READ ACCESSES THROUGH BUS | NUMBER OF WRITE ACCESSES THROUGH BUS | RATE OF REDUCTION IN NUMBER OF ACCESSES |
|---|---|---|---|
| 0 | 4 | 1 | 0% (5 ACCESSES) |
| 1 | 3 | 1 | 20% (4 ACCESSES) |
| 2 | 3 | 1 | 20% (4 ACCESSES) |
| 3 | 2 | 1 | 40% (3 ACCESSES) |

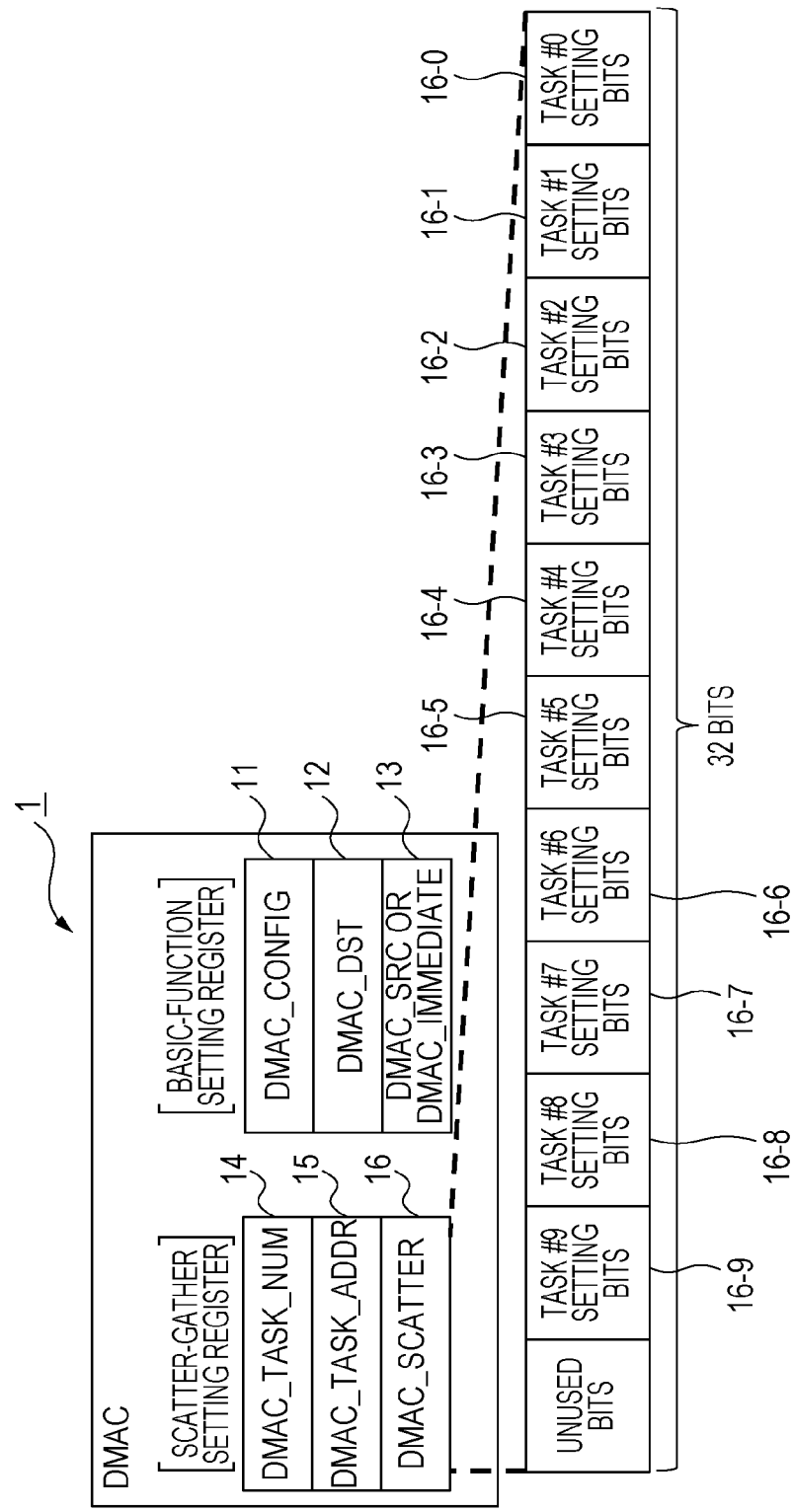

FIG. 14

| VALUE OF SETTING BITS | DETAILS OF OPERATION |
|---|---|
| 0 | GENERAL SCATTER-GATHER OPERATION |
| 1 | SPECIFY DMAC_CONFIG = 0x0000_0001, AND DOES NOT READ SETTING VALUE FOR DMAC_CONFIG FROM MEMORY |
| 2 | SPECIFY IMMEDIATE VALUE FOR VALUE TO BE WRITTEN, AND DOES NOT READ COPY-SOURCE DATA |
| 3 | SPECIFY DMAC_CONFIG = 0x0000_0001 AND IMMEDIATE VALUE FOR VALUE TO BE WRITTEN |
| 4 | SPECIFY DMAC_CONFIG = 0x0000_0001 AND SET ALL VALUES TO BE WRITTEN TO "0" |
| 5 | SPECIFY DMAC_CONFIG = 0x0000_0001 AND SET ALL VALUES TO BE WRITTEN TO "1" |
| 6 | UNDEFINED |
| 7 | UNDEFINED |

| VALUE OF SETTING BITS | NUMBER OF READ ACCESSES THROUGH BUS | NUMBER OF WRITE ACCESSES THROUGH BUS | RATE OF REDUCTION IN NUMBER OF ACCESSES |
|---|---|---|---|
| 0 | 4 | 1 | 0% (5 ACCESSES) |
| 1 | 3 | 1 | 20% (4 ACCESSES) |
| 2 | 3 | 1 | 20% (4 ACCESSES) |
| 3 | 2 | 1 | 40% (3 ACCESSES) |
| 4 | 1 | 1 | 60% (2 ACCESSES) |
| 5 | 1 | 1 | 60% (2 ACCESSES) |

FIG. 20

| | |
|---|---|
| config OF TASK #3 | 0x2000_002C |
| Dst addr OF TASK #3 | 0x2000_0028 |
| Src addr OF TASK #3 | 0x2000_0024 |
| onfig OF TASK #2 | 0x2000_0020 |
| Dst addr OF TASK #2 | 0x2000_001C |
| Src addr OF TASK #2 | 0x2000_0018 |
| config OF TASK #1 | 0x2000_0014 |
| Dst addr OF TASK #1 | 0x2000_0010 |
| Src addr OF TASK #1 | 0x2000_000C |
| config OF TASK #0 | 0x2000_0008 |
| Dst addr OF TASK #0 | 0x2000_0004 |
| Src addr OF TASK #0 | 0x2000_0000 |
| | |

FIG. 22

| VALUE (BOTTOM 3 BITS) OF SETTING BITS | DETAILS OF OPERATION |
|---|---|
| 0 | GENERAL SCATTER-GATHER OPERATION |
| 1 | SPECIFY DMAC_CONFIG = 0x0000_0001, AND DOES NOT READ SETTING VALUE FOR DMAC_CONFIG FROM MEMORY |
| 2 | SPECIFY IMMEDIATE VALUE FOR VALUE TO BE WRITTEN, AND DOES NOT READ COPY-SOURCE DATA |
| 3 | SPECIFY DMAC_CONFIG = 0x0000_0001 AND IMMEDIATE VALUE TO BE WRITTEN |
| 4 | SPECIFY DMAC_CONFIG = 0x0000_0001 AND SET ALL VALUES TO BE WRITTEN TO "0" |
| 5 | SPECIFY DMAC_CONFIG = 0x0000_0001 AND SET ALL VALUES TO BE WRITTEN TO "1" |
| 6 | UNDEFINED |
| 7 | UNDEFINED |

| VALUE (TOP 1 BIT) OF SETTING BITS | TASK START TRIGGER |
|---|---|
| 0 | WHEN PREVIOUS TASK IS COMPLETED |
| 1 | WHEN DMAC RECEIVE TRIGGER SIGNAL FROM PERIPHERAL CIRCUIT |

FIG. 26

| Address | Content | Description |
|---|---|---|
| 0x2000_002C | config OF TASK #3 | = don't care |
| 0x2000_0028 | Dst addr OF TASK #3 | ADDRESS IN TRANSMISSION DATA REGISTER IN SPI |
| 0x2000_0024 | Src addr OF TASK #3 | ADDRESS IN DATA REGISTER IN ADC |
| 0x2000_0020 | config OF TASK #2 | = don't care |
| 0x2000_001C | Dst addr OF TASK #2 | ADDRESS IN GPIO_OUT REGISTER IN GPIO PORT |
| 0x2000_0018 | Src addr OF TASK #2 | = don't care |
| 0x2000_0014 | config OF TASK #1 | = don't care |
| 0x2000_0010 | Dst addr OF TASK #1 | ADDRESS IN START REGISTER IN ADC |
| 0x2000_000C | Src addr OF TASK #1 | = don't care |
| 0x2000_0008 | config OF TASK #0 | = don't care |
| 0x2000_0004 | Dst addr OF TASK #0 | ADDRESS IN GPIO_OUT REGISTER IN GPIO PORT |
| 0x2000_0000 | Src addr OF TASK #0 | = don't care |

DMA CONTROL DEVICE, MICRO CONTROL UNIT, AND DMA CONTROL METHOD

CROSS-REFERENCE TO RELATED APPLICATION

This application is based upon and claims the benefit of priority of the prior Japanese Patent Application No. 2015-008626, filed on Jan. 20, 2015, the entire contents of which are incorporated herein by reference.

FIELD

The embodiments discussed herein are related to a DMA control device, a micro control unit, and a DMA control method.

BACKGROUND

In recent years, various systems have a direct memory access (DMA) transfer function that performs data transfer between memories or between a memory and a peripheral circuit without involvement of a central processing unit (CPU).

For example, a DMA control device (DMA controller (DMAC)) is built into a micro controller unit (MCU) in conjunction with a CPU (CPU core), a memory, a peripheral circuit, and so on. The memory is implemented by, for example, a static random-access memory (SRAM).

In addition, for example, the MCU has a scatter-gather mode in which, during DMA transfer, data can be gathered and sequentially transferred to scattered memory blocks.

There has been proposed a method in which a scatter-gather mode and functions in which various signals can be used as a trigger signal for starting a task executed in the scatter-gather mode are combined to control peripheral circuits without operating a CPU.

Various DMA control technologies have been proposed heretofore.

Examples of related technologies are disclosed in Japanese Laid-open Patent Publication No. 06-060013, Japanese Laid-open Patent Publication No. 2003-058491, and Japanese Laid-open Patent Publication No. 2011-070372.

As described above, there has been proposed a method for controlling peripheral circuits in a scatter-gather mode without operating a CPU. This peripheral circuit control is performed through writing to and reading from registers included in the peripheral circuits.

In general, however, since the addresses in the registers may be discontiguous, for example, the DMAC executes writing to or reading from each register as one task. Consequently, the number of processing cycles increases, leading to an increase in the power consumption.

Also, in order to increase the efficiency of a plurality of accesses involving the DMAC to discontiguous addresses, it is conceivable to execute writing or reading as one task by using a reference address and a relative address. However, when a task of performing writing to or reading from a register only once is executed, which task is frequently performed during operation of a peripheral circuit, it is difficult to reduce the number of processing cycles.

SUMMARY

According to an aspect of the invention, a direct memory access (DMA) control device including: a basic-function setting register used to perform DMA operation; and a scatter-gather setting register in which a value indicating that a task is executed through setting of a directly defined value for data to be written to the basic-function setting register without reading the data from a memory through a bus is set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram for describing an example of the setting register configuration in the DMA control device illustrated in FIG. 3;

FIG. 11 is a table for describing an effect of reduction in the number of accesses through a bus in the DMA control device in the first embodiment;

FIG. 13 is a block diagram illustrating a setting register configuration in a second embodiment in the DMA control device;

FIG. 14 is a table for describing an example of the setting register configuration in the DMA control device illustrated in FIG. 13;

FIG. 20 is a diagram (part 2) for describing the operation of the DMA control device illustrated in FIG. 18;

FIG. 22 has tables for describing an example of the setting register configuration illustrated in FIG. 21;

FIG. 26 is a diagram illustrating an example of values to be read into basic-function setting registers in the DMA control device before each task stored in an SRAM illustrated in FIG. 23 is executed;

DESCRIPTION OF EMBODIMENTS

Figure 1:
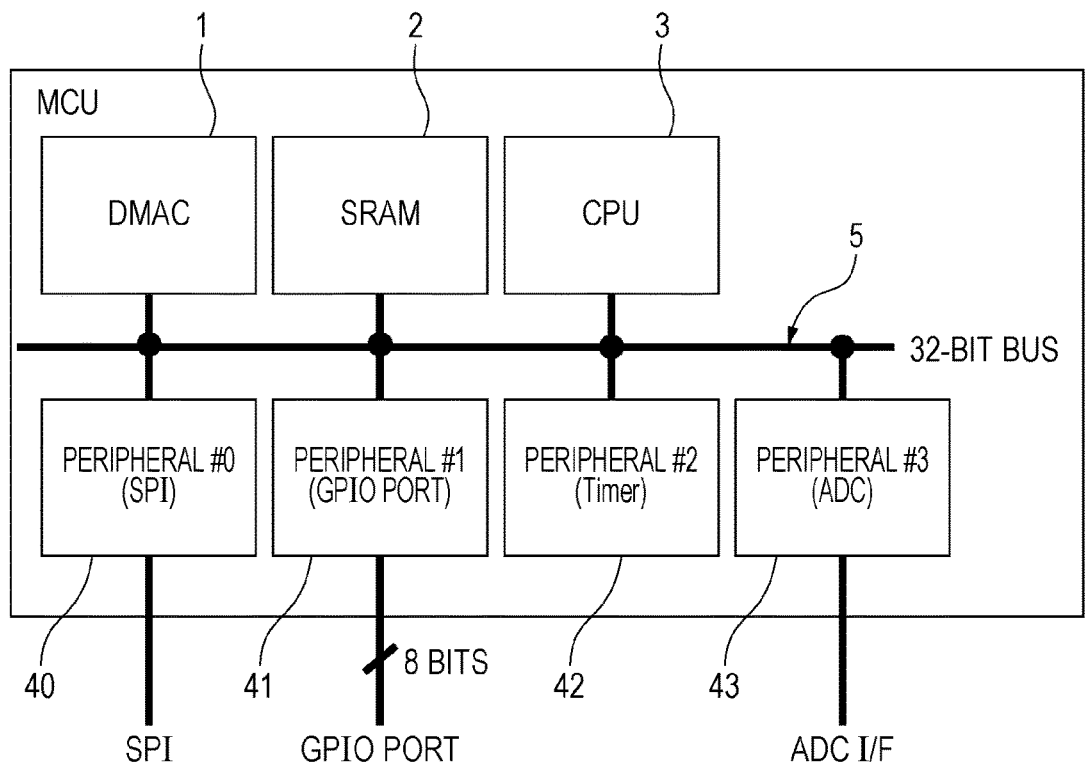
FIG. 1 is a block diagram illustrating an example of a micro control unit.

Before a DMA control device, a micro control unit, and a DMA control method in embodiments are described in detail, an example of a DMA control device and problems therewith will be described first with reference to FIGS. 1 and 2. FIG. 1 is a block diagram illustrating an example of a microcontroller.

As illustrated in FIG. 1, a micro control unit (MCU) includes a DMA control device (DMAC) 1, a memory (SRAM) 2, a CPU core (CPU) 3, peripheral circuits (peripherals #0 to #3), and a bus 5 that connects these elements.

For example, peripheral #0 is a serial peripheral interface (SPI), and peripheral #1 is a general-purpose input/output (GPIO) port. In addition, for example, peripheral #2 is a timer, and peripheral #3 is an analog-to-digital converter (ADC).

For example, peripheral #0 (SPI) is connected to an external wireless module via an SPI thereof, and peripheral #1 (GPIO port) is connected to an external sensor power supply, as will be described below in detail with reference to FIG. 23. In addition, for example, peripheral #3 (ADC) is connected to an external temperature sensor via an ADC interface (I/F). Peripherals #0 to #3, the DMAC 1, the SRAM 2, and the CPU core 3 are connected to each other through, for example, the bus 5, which is a 32-bit bus.

The number of and the types of peripherals #0 to #3 and the bit width (32 bits) of the bus 5 are merely examples, and it goes without saying that various configurations are possible. Also, an MCU provided with a DMA control device can be widely used for various types of electronic equipment, for example, for a wireless terminal (a wireless sensor node, desired to consume a small amount of power) in a wireless sensor network.

Figure 2:
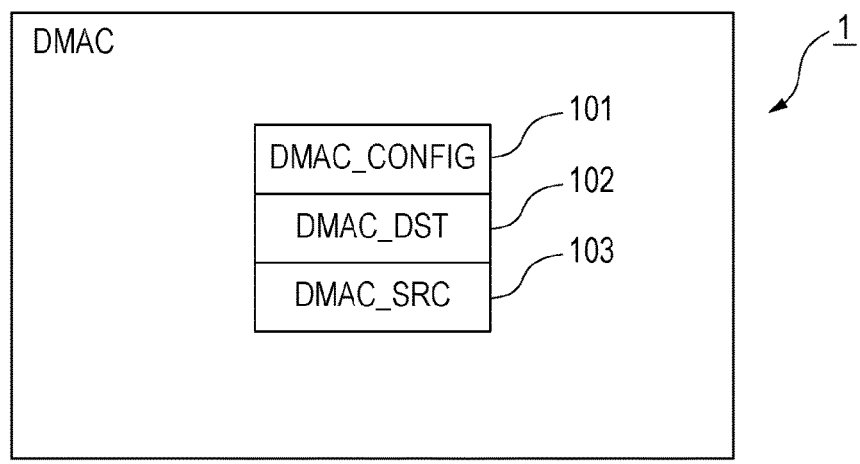
FIG. 2 is a block diagram illustrating a setting register configuration in an example of a DMA control device.

FIG. 2 is a block diagram illustrating a setting register configuration in an example of the DMA control device and illustrates basic-function setting registers. As illustrated in FIG. 2, the DMA control device (DMAC) 1 includes a configuration (DMAC_CONFIG) register 101, a destination-address (DMAC_DST) register 102, a source-address (DMAC_SRC) register 103, and so on as basic-function setting registers.

The DMAC 1 has a function for reading data starting at an address specified by the DMAC_SRC register 103 and ending at an address of a section specified by the DMAC_CONFIG register 101 and for writing the read data to an area starting an address specified by the DMAC_DST register 102 and ending at an address of a section specified by the DMAC_CONFIG register 101. Such a process for copying data in a certain area starting at one address to a certain area starting at another address is hereinafter referred to as a "task".

Thus, for example, when data is copied using the DMAC 1, there is an advantage that the CPU core 3 can execute another processing program during the copy. When the CPU core 3 is compared with the DMAC 1 with respect to energy consumption (power consumption), the circuit size of the DMAC 1 is generally smaller, and the power consumption is larger when data is copied using a program that runs on the CPU core 3 than the power consumption when data is copied using the DMAC 1.

This is because, when data is copied using the CPU core 3, for example, energy is consumed for reading a program from the SRAM 2 (or a flash memory or the like, not illustrated) in which the program is stored, and the power consumed by the CPU core 3 is also large. Thus, it is preferable that data be copied using the DMAC 1, for example, in cases including, particularly, the case of a wireless sensor node or the like in which lower power consumption is strongly desired.

Setting of the DMAC_SRC register 103, the DMAC_DST register 102, and the DMAC_CONFIG register 101 is performed in order to cause the DMAC 1 to execute one task, and typically, the CPU core 3 writes setting values to the DMAC_SRC register 103, the DMAC_DST register 102, and the DMAC_CONFIG register 101.

Accordingly, a possible approach is that details of setting of the DMAC_SRC register 103, the DMAC_DST register 102, and the DMAC_CONFIG register 101, the details of the setting corresponding to a plurality of tasks, are pre-stored in the SRAM 2, and when the timing at which each task is started is reached, the DMAC 1 reads the details of the setting from the SRAM 2 to execute the task. That is, the DMAC 1 has been proposed that has a scatter-gather function (a scatter-gather mode) in which a plurality of tasks can be sequentially executed without involvement of the CPU core 3.

However, as described above with reference to FIG. 1, the MCU has the GPIO port 41, the timer 42, the ADC 43, and serial I/Fs, such as the SPI 40, as peripheral circuits (peripherals #0 to #3).

The MCU further has a digital-to-analog converter (DAC), a pulse width modulator (PWM), serial I/Fs, such as an Inter-Integrated Circuit (I²C) and a universal asynchronous receiver/transmitter (UART), and so on as peripheral circuits. Control of the peripheral circuits and exchange of data are performed via various registers included in the individual peripheral circuits.

More specifically, for example, the GPIO port has an input/output mode (GPIO_MODE) register, an output-data (GPIO_OUT) register, and an input-data (GPIO_IN) register. An input/output direction at the GPIO port is controlled using a value written in the GPIO_MODE register, and during an input mode, it is possible to know the value of the level of a voltage input to the GPIO port from outside of the MCU, by reading the value in the GPIO_IN register. During an output mode, by writing a value to the GPIO_OUT register, it is possible to switch the voltage level of a signal output to outside of the MCU to either a high level "H" or a low level "L".

In addition, for example, a serial I/F, such as a UART, has a control register (ContReg) and a data register (DataReg). When data is to be output, a value to be output is written to DataReg, and then a value for giving an instruction indicating data output is written to ContReg. With this configuration, for example, desired data can be output from the UART.

In recent years, an MCU has been proposed that is adapted to allow various state signals from peripheral circuits to be used as a trigger signal for starting a next task in a scatter-gather mode. The trigger signal is, for example, a signal output upon detection of a case in which a predetermined value is received by the GPIO port (peripheral #1) 41 or a case in which data conversion in the ADC (peripheral #3) 43 is completed.

Alternatively, the trigger signal is, for example, a signal output upon detection of a case in which data transmission or reception performed by the SPI (peripheral #0) 40 is completed or a case in which a count value in the timer (peripheral #2) 42 reaches a desired value. Alternatively, the trigger signal is, for example, a signal output upon detection of a case in which output performed by the DAC is completed or a case in which output performed by the PWM is completed.

When the scatter-gather mode and functions in which various signals can be used as a trigger signal for starting a task executed in the scatter-gather mode are combined as described above, the peripheral circuits (such as peripherals #0 to #3) can be controlled without operating the CPU core 3.

As described above, the peripheral circuits can be controlled through writing to and reading from the various registers included in the peripheral circuits. The DMAC 1 may perform, as a task, the writing to and reading from a register to be used, and various types of trigger signal may be used to indicate the start timing of the task.

In this case, writing to and reading from a plurality of registers in the peripheral circuits are performed, and typically, the addresses in the registers may be discontiguous. Thus, for example, since the DMAC 1 executes the writing to and reading from each register as a single task, the number of processing cycles increases, which leads to an increase in the power consumption.

Also, in order to increase the efficiency of a plurality of accesses involving the DMAC to discontiguous addresses, it is conceivable to execute writing or reading as one task by using a reference address and a relative address. However, when a task for performing writing to or reading from a register only once, which task is frequently performed in operations for the peripheral circuits, it is difficult to reduce the number of processing cycles.

Figure 3:
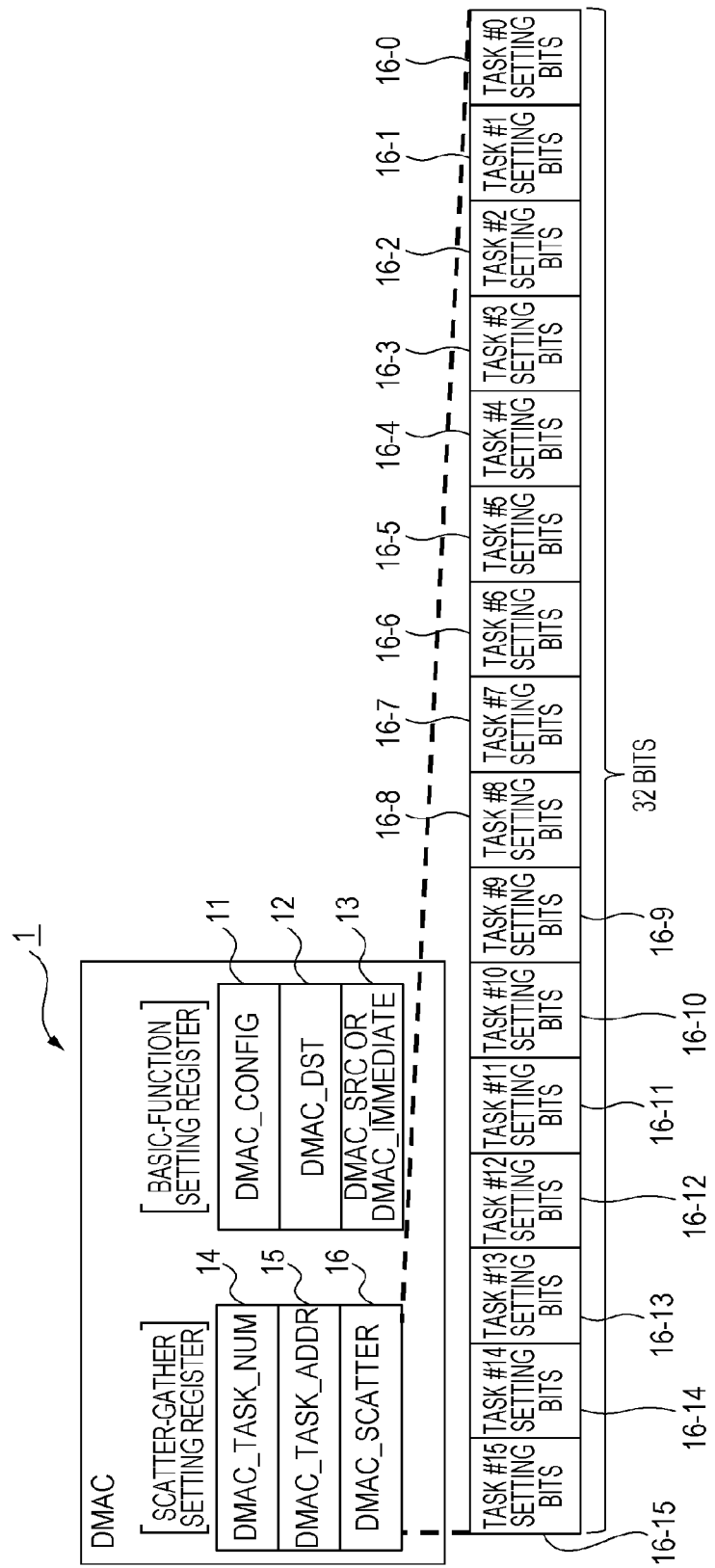
FIG. 3 is a block diagram illustrating a setting register configuration in a DMA control device in a first embodiment.

A DMA control device, a microcontroller, and a DMA control method in embodiments will be described below in detail with reference to the accompanying drawings. FIG. 3 is a block diagram illustrating a setting register configuration in a DMA control device (DMAC) 1 in a first embodiment.

As illustrated in FIG. 3, the DMAC 1 in the first embodiment includes basic-function setting registers 11 to 13, which correspond to the basic-function setting registers 101 to 103 described above with reference to FIG. 2, and scatter-gather setting registers 14 to 16.

That is, the DMAC 1 includes a configuration (DMAC_CONFIG) register 11, a destination-address (DMAC_DST) register 12, a source-address (DMAC_SRC) register 13, and so on as the basic-function setting registers.

As described above, the DMAC 1 has a function for reading data starting at an address specified by the DMAC_SRC register 13 and ending at a section specified by the DMAC_CONFIG register 11 and for writing the read data to an area starting at an address specified by the DMAC_DST register 12 and ending at the section specified by the DMAC_CONFIG register 11. In the DMAC 1 in the first embodiment, the DMAC_SRC register 13, which is a basic-function setting register, may be an immediate-value (DMAC_IMMEDIATE) register. That is, the DMAC_SRC register 13 is adapted to be used as a DMAC_IMMEDIATE register in accordance with the value of setting bits. The register 13 is hereinafter referred to as the "DMAC_SRC register 13" or "DMAC_IMMEDIATE register 13" in accordance with the form of use.

The DMAC 1 further includes a DMAC_TASK_NUM register 14 and a DMAC_TASK_ADDR register 15 as scatter-gather setting registers. The number of tasks to be executed is set in the DMAC_TASK_NUM register 14, and addresses where the contents of the basic-function setting registers for a task (#0) that is executed first are stored is set in the DMAC_TASK_ADDR register 15. Heretofore, a configuration in which these DMAC_TASK_NUM register 14 and DMAC_TASK_ADDR register 15 are provided in, for example, the DMAC illustrated in FIG. 2 has been available. The DMAC 1 in the first embodiment further has, as a scatter-gather setting register, a DMAC_SCATTER register 16 (a first register) for switching between scatter-gather operations (modes).

As illustrated in FIG. 3, in the DMAC_SCATTER register 16, for example, 32 bits are assigned to 16 tasks #0 to #15, and four values can be set using 2 bits for each task. That is, with the DMAC_SCATTER register 16, each of operations on tasks to be sequentially executed in the scatter-gather is set using 2 bits, and details of processing in each task are changed based on the setting.

Figure 4:
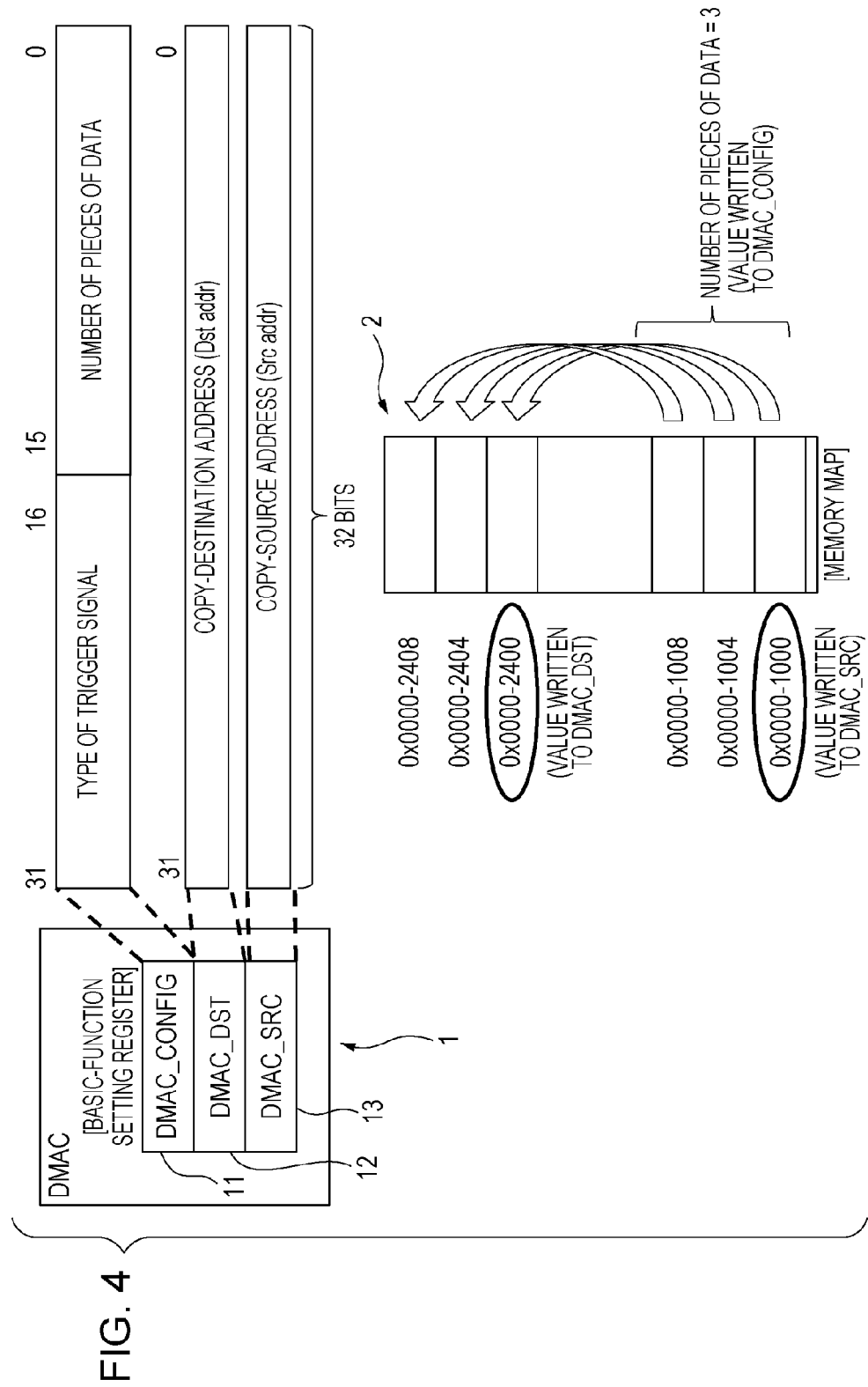
FIG. 4 is a diagram for describing an operation of a basic function of the DMA control device illustrated in FIG. 3.

FIG. 4 is a diagram for describing an operation of a basic function of the DMA control device 1 illustrated in FIG. 3. FIG. 4 illustrates details of the basic-function setting registers (the DMAC_CONFIG register 11, the DMAC_DST register 12, and the DMAC_SRC register 13) and a state in which data is copied during processing of one general task (i.e., one task that is not executed in the scatter-gather mode).

More specifically, an operation in a case in which values (addresses) noted below are set in the DMAC_CONFIG register 11, the DMAC_DST register 12, and the DMAC_SRC register 13 is considered as an example operation of a basic function of the DMAC 1.

DMAC_CONFIG=0x0000_0003
DMAC_DST=0x0000_2400
DMAC_SRC=0x0000_1000

That is, the number (three: 0x0000_0003) of pieces of data desired to be copied is set in the DMAC_CONFIG register 11, the starting address (0x0000_1000) of a copy source is set in the DMAC_SRC register 13, and the starting address (0x0000_2400) of a copy destination is set in the DMAC_DST register 12.

In addition, after the setting is performed on the basic-function setting registers 11 to 13 (i.e., after writing thereto is performed) in the manner described above, the following value is set for a DMAC_ENABLE register (not illustrated).

DMAC_ENABLE=0x0000_0001

Alternatively, after desired values are written to the basic-function setting registers 11 to 13, "1 (a value giving an instruction for starting execution of a general task" may be written to a DMAC_START register (not illustrated).

With such an arrangement, data (the number of pieces of data=3) at 0x0000_1000 to 0x0000_1008 are read to the DMAC 1 through the bus 5, and the read data are written to 0x0000_2400 to 0x0000_2408 through the bus 5 (i.e., three 32-bit data are copied), as illustrated in FIG. 4.

Figure 5:
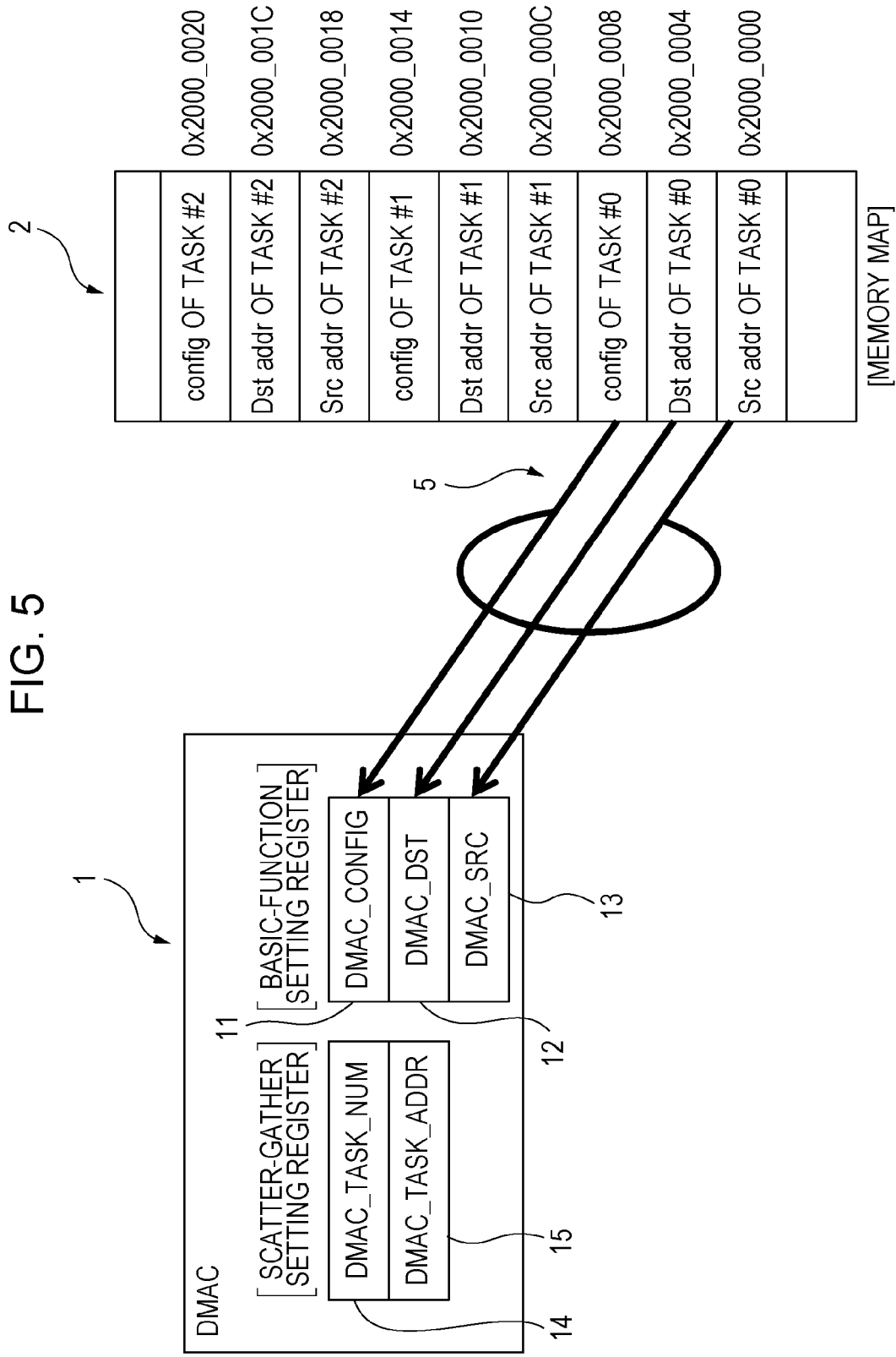
FIG. 5 is a diagram for describing an operation of a scatter-gather function in the DMA control device illustrated in FIG. 3.

FIG. 5 is a diagram for describing an operation of a scatter-gather function in the DMA control device 1 illustrated in FIG. 3 and illustrates how values in the DMAC_CONFIG register 11, the DMAC_DST register 12, and the DMAC_SRC register 13 are read for execution of a plurality of tasks during execution in scatter-gather modes.

The number of tasks to be executed is set in the DMAC_TASK_NUM register 14, which is a scatter-gather setting register, and the addresses in the memory (the SRAM 2) in which the values in the registers used for execution of the tasks are stored are set in the DMAC_TASK_ADDR register 15.

First, the contents of the basic-function setting register which are to be used for executing tasks #0 to #2 are prepared in the SRAM 2. That is, as illustrated in FIG. 5, details of setting for the DMAC_SRC register 13, the DMAC_DST register 12, and the DMAC_CONFIG register 11, the details corresponding to three tasks #0 to #2, are pre-stored in the SRAM 2.

More specifically, the DMAC_TASK_NUM register 14 (the number of tasks to be executed in the scatter-gather)=3 is set, and the DMAC_TASK_ADDR register 15 (an address at which the contents of the basic-function setting registers for task #0 to be executed first are stored)=0x2000_0000 is set.

That is, when DMAC_TASK_NUM=3 and DMAC_TASK_ADDR=0x2000_0000 are set, for example, "2 (a value for giving an instruction for starting execution of the scatter-gather mode)" is written to the DMAC_START register (not illustrated) to thereby cause the DMAC 1 to start the scatter-gather mode.

First, values in the SRAM 2 are sequentially read starting from the address written in the DMAC_TASK_ADDR register 15, the read values are copied to the DMAC_SRC register 13, the DMAC_DST register 12, and the DMAC_CONFIG register 11, and the DMAC 1 executes task #0 based on the values in the three registers 13, 12, and 11. That is, as illustrated in FIG. 5, when the scatter-gather function (mode) is started, the DMAC 1 copies the values at 0x2000_0000 to 0x2000_0008 in the SRAM 2 to the basic-function setting registers (the DMAC_SRC register 13, the DMAC_DST register 12, and the DMAC_CONFIG register 11) and executes task #0.

Also, when task #0 is completed, the DMAC 1 reads the values at 0x2000_0014 to 0x2000_000C in the SRAM 2, copies the read values to the three basic-function setting registers 13, 12, and 11, and executes task #1 based on the values in the basic-function setting registers 13, 12, and 11. In addition, the DMAC 1 executes task #2 in the same manner as task #1.

FIG. 6 is a diagram for describing an example of the first register 16 in the setting register configuration in the DMA control device 1 illustrated in FIG. 3. Since 2 bits is assigned in the first register 16 as setting bits for each of tasks #0 to #15, as described above with reference to FIG. 3, four values "0" to "3" can be set as the values (modes) of the setting bits.

That is, as illustrated in FIG. 6, when the value (setting value) of the setting bits is "0", the DMAC 1 performs an operation corresponding to general (typical) scatter-gather. Also, when the setting value is "1", the DMAC 1 does not read a setting value for the DMAC_CONFIG register 11 from the SRAM 2, and for example, the DMAC 1 directly specifies DMAC_CONFIG=0x0000_0001 and executes a task.

In addition, when the setting value is "2", for example, the DMAC 1 does not read copy-source data from the SRAM 2, and for task execution, the DMAC 1 writes a value written in the DMAC_SRC register 13 to the DMAC_DST register 12 and specifies an immediate value for a value to be written. When the setting value is "3", the DMAC 1 does not read a setting value for the DMAC_CONFIG register 11 from the SRAM 2, and for example, the DMAC 1 directly specifies DMAC_CONFIG=0x0000_0001 and specifies an immediate value for a value to be written.

As described above, the DMA control device in the first embodiment has, for example, four operation modes (the setting values "0" to "3") for tasks to be executed in the scatter-gather modes and is adapted to be able to set the corresponding operation modes for 16 tasks (#0 to #15).

Next, operations for the above-described setting bits=0 to 3 will be described with reference to FIGS. 7 to 10. In the flowcharts illustrated in FIGS. 7 to 10, processing blocks with thick lines represent processes for access for reading from the SRAM 2 (memory) through the bus 5, and processing blocks with double lines represent processes for access for writing to the SRAM 2 through bus 5.

Figure 7:
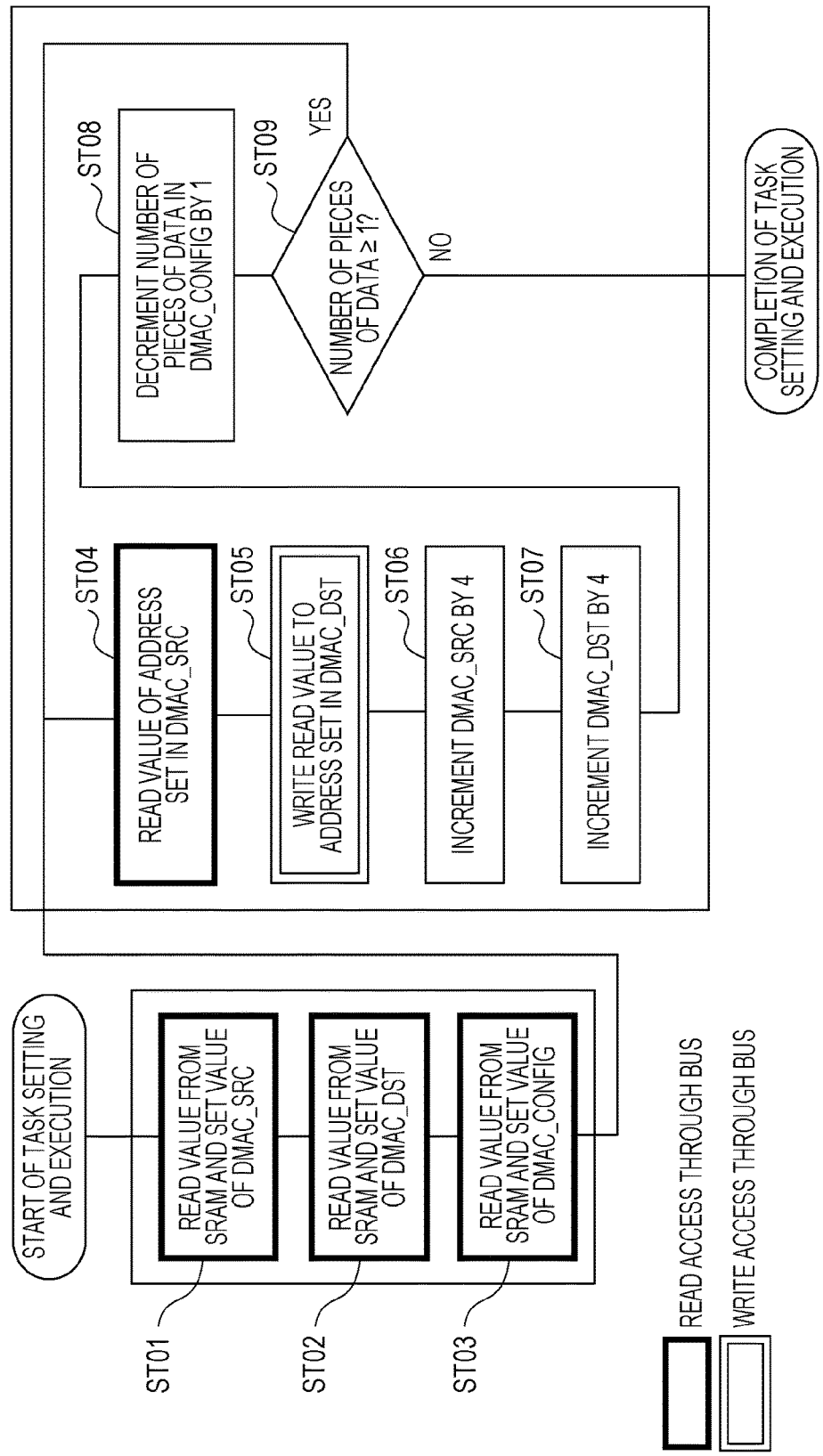
FIG. 7 is a flowchart illustrating an example operation for setting bits=0 in the setting register configuration illustrated in FIG. 6.

FIG. 7 is a flowchart illustrating an example operation for the setting bits=0 (the setting value is "0") in the setting register configuration illustrated in FIG. 6. As described above, the operation when the setting value is "0" is similar to the operation for the processing in a general scatter-gather mode.

As illustrated in FIG. 7, upon start of task setting and execution processing when the setting value is "0", in step ST01, a value for the DMAC_SRC register 13 is read from the SRAM 2, the read value is set in the DMAC_SRC register 13, and the process proceeds to step ST02.

In step ST02, a value for the DMAC_DST register 12 is read from the SRAM 2, the read value is set in the DMAC_DST register 12, and the process proceeds to step ST03. In step ST03, a value for the DMAC_CONFIG register 11 is read from the SRAM 2, the read value is set in the DMAC_CONFIG register 11, and the process proceeds to step ST04.

In step ST04, the value (the starting address of a copy source) set in the DMAC_SRC register 13 is read, and the process proceeds to step ST05 in which the read value (data) is written to the address indicated by the value (the starting address of a copy destination) set in the DMAC_DST register 12.

The processes in steps ST01 to ST04 are processes for access for reading from the SRAM 2 through the bus 5, and the process in step ST05 is access for writing to the SRAM 2 through the bus 5.

In addition, in step ST06, the DMAC_SRC register 13 is incremented by "4", in step ST07, the DMAC_DST register 12 is incremented by "4", and the process proceeds to step ST08. The incrementation by "4" in steps ST06 and ST07 is merely an example, and the incrementation is not limited to "4".

In step ST08, the number of pieces of data which is set in the DMAC_CONFIG register 11 is decremented by "1", and the process proceeds to step ST09 in which a determination is made as to whether or not the number of pieces of data is 1 or more (the number of pieces of data 1). If it is determined in step ST09 that the number of pieces of data 1 is satisfied, the process returns to step ST04 and similar processing is repeated, and if it is determined that the number of pieces of data 1 is not satisfied, that is, the number of pieces of data is zero, the task setting and execution processing is completed (finished).

Figure 8:
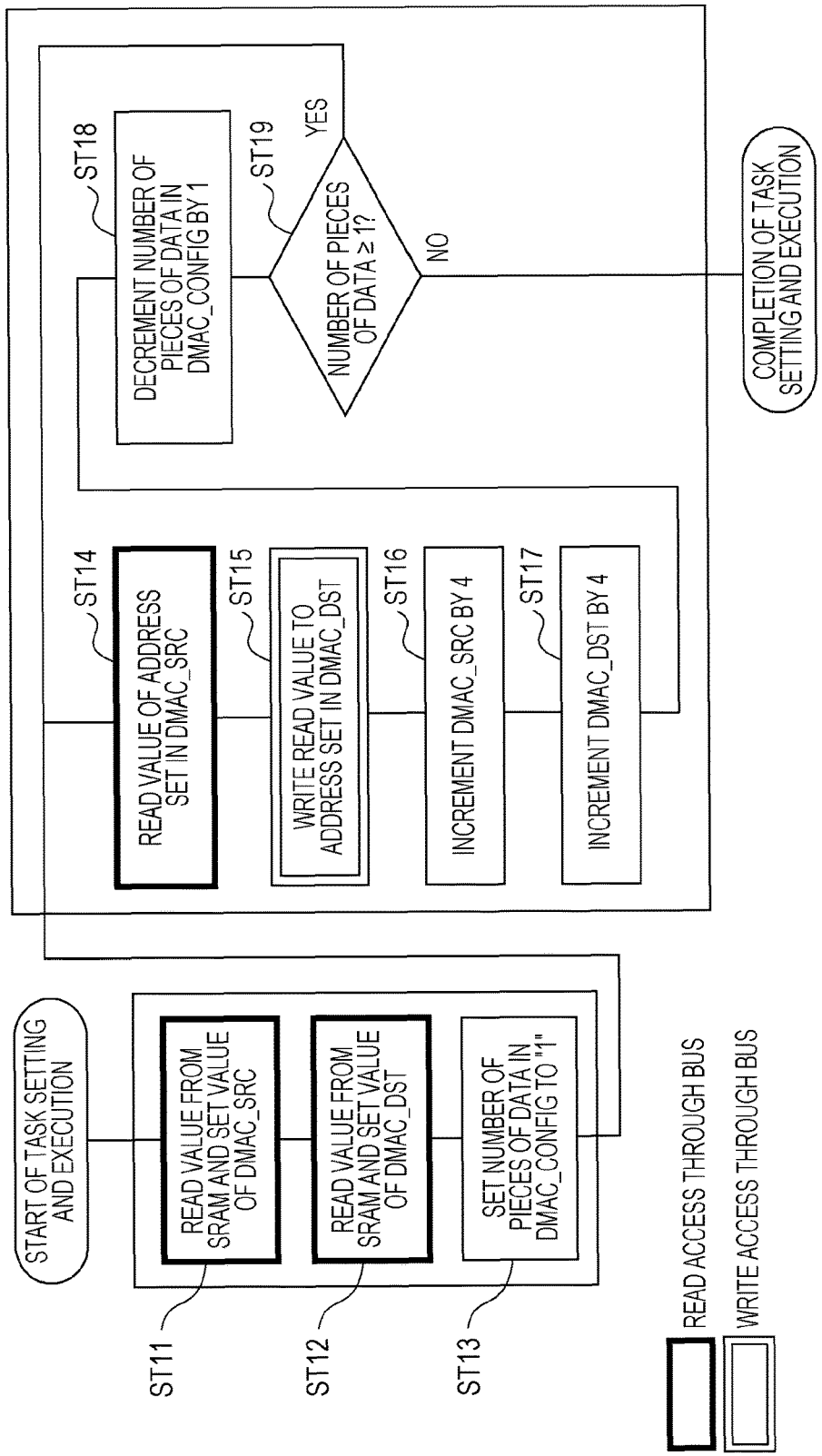
FIG. 8 is a flowchart illustrating an example operation for the setting bits=1 in the setting register configuration illustrated in FIG. 6.

FIG. 8 is a flowchart illustrating an example operation for the setting bits=1 (the setting value is "1") in the setting register configuration illustrated in FIG. 6. As is apparent from comparison of FIG. 8 with FIG. 7, when the setting value is "1", the process in step ST03 in FIG. 7 is replaced with a process in step ST13 in which the bus 5 is not used.

Processes in steps ST11, ST12, and ST14 to ST19 in FIG. 8 are the same as or similar to the processes in steps ST01, ST02, and ST04 to ST09 in FIG. 7, and descriptions thereof are not given hereinafter.

As illustrated in FIG. 8, in step ST12, a value for the DMAC_DST register 12 is read from the SRAM 2, and the read value is set in the DMAC_DST register 12. Thereafter, the process proceeds to step ST13 in which the DMAC 1 sets the number of pieces of data in the DMAC_CONFIG register 11 to "1". That is, when the setting value is "1", the DMAC 1 directly sets the number of pieces of data to "1" by specifying DMAC_CONFIG=0x0000_0001, without reading a setting value for the DMAC_CONFIG register 11 from the SRAM 2.

When the setting value is "1", the DMAC 1 directly specifies DMAC_CONFIG=0x0000_0001 (i.e., sets the number of pieces of data to 1), as described above, and thus the result in the determination in step ST19 automatically indicates NO, so that the task setting and execution processing is completed.

Thus, when the setting value is "1", it is possible to omit the access for reading from the SRAM 2 through the bus 5 in step ST03 in the processing (described above with reference to FIG. 7) performed when the setting value is "0", thus making it possible to reduce the number of memory accesses through the bus 5 by "1".

Figure 9:
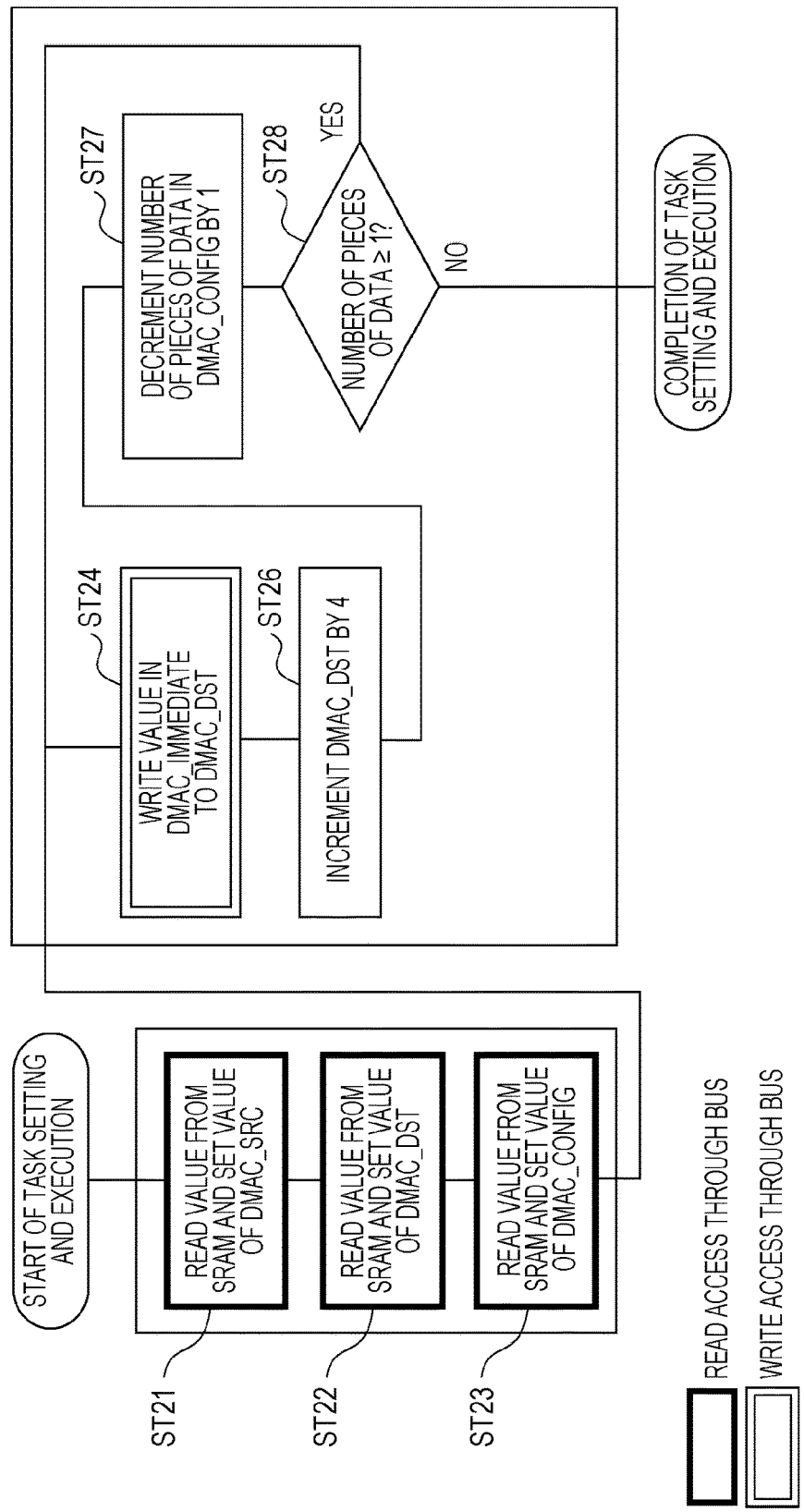
FIG. 9 is a flowchart illustrating an example operation for the setting bits=2 in the setting register configuration illustrated in FIG. 6.

FIG. 9 is a flowchart illustrating an example operation for the setting bits=2 (the setting value is "2") in the setting register configuration illustrated in FIG. 6. As is apparent from comparison of FIG. 9 with FIG. 7, when the setting value is "2", the process in step ST01 in FIG. 7 is replaced with a process using the DMAC_IMMEDIATE register 13, as in step ST21.

In addition, the processes in steps ST04 and ST05 in FIG. 7 are replaced with a process in step ST24. Since processes in steps ST22, ST23, and ST25 to ST28 in FIG. 9 are the same as or similar to the processes in steps ST02, ST03, and ST06 to ST09 in FIG. 7, descriptions thereof are not given hereinafter.

As illustrated in FIG. 9, upon start of the task setting and execution processing when the setting value is "2", in step ST21, a value for the DMAC_IMMEDIATE register 13 is read from the SRAM 2, the read value is set in the DMAC_IMMEDIATE register 13, and the process proceeds to step ST22.

In step ST22, a value for the DMAC_DST register 12 is read from the SRAM 2, the read value is set in the DMAC_DST register 12. In step ST23, a value for the DMAC_CONFIG register 11 is read from the SRAM 2, and the read value is set in the DMAC_CONFIG register 11. Thereafter, the process proceeds to step ST24.

In step ST24, the value in the DMAC_IMMEDIATE register 13 is written to the DMAC_DST register 12. That is, since the value to be written to an address indicated by the DMAC_DST register 12 is the DMAC_IMMEDIATE register (shared with the DMAC_SRC register) 13, the process (step ST04 in FIG. 7) in which the value to be written is read via the bus 5 may be omitted. As a result, compared with the above-described case in which the setting value is "0", the number of processes for reading a value from the memory 2 can be reduced by 1.

Figure 10:
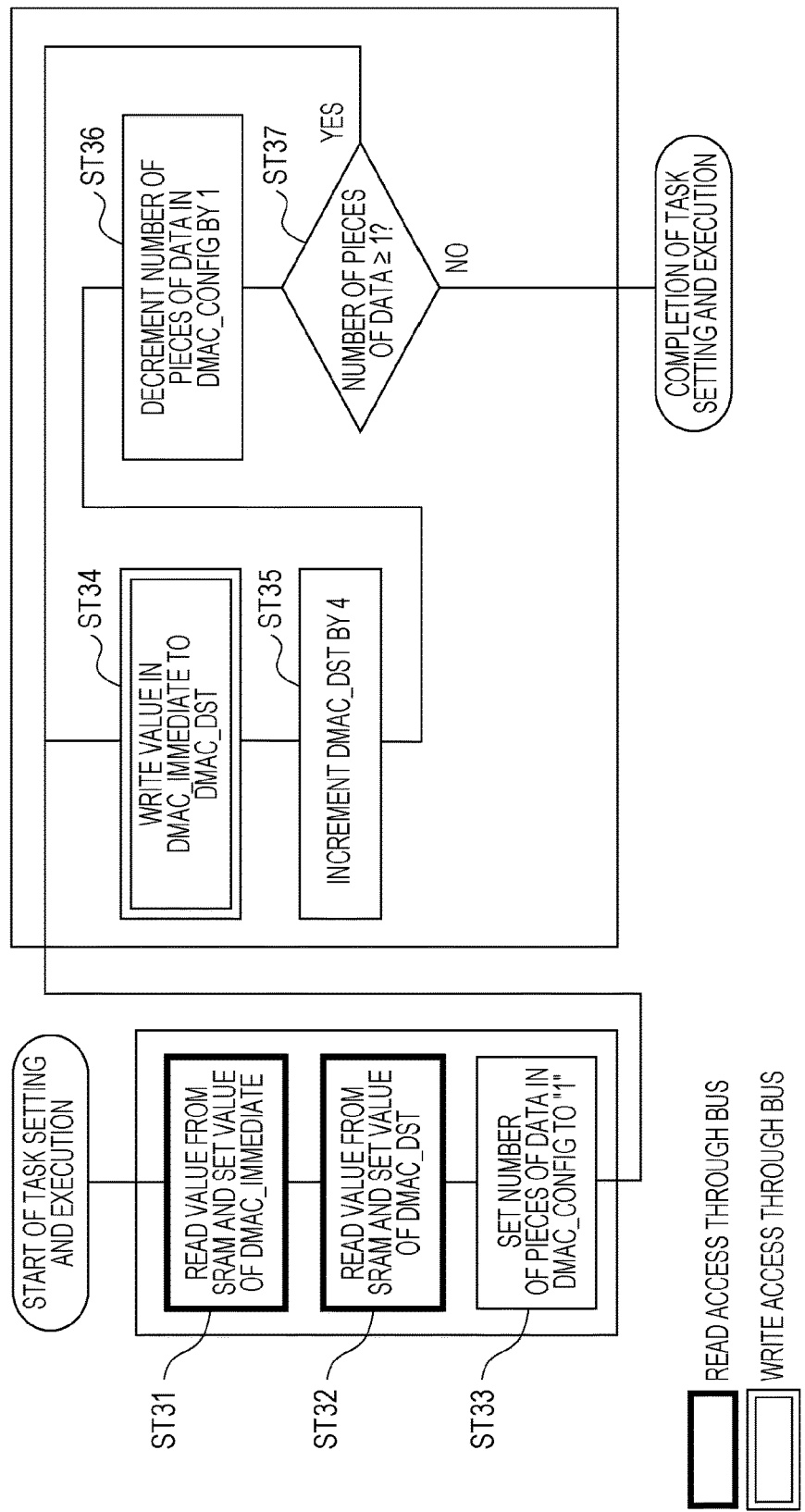
FIG. 10 is a flowchart illustrating an example operation for the setting bits=3 in the setting register configuration illustrated in FIG. 6.

FIG. 10 is a flowchart illustrating an example operation for the setting bits=3 (the setting value is "3") in the setting register configuration illustrated in FIG. 6 and corresponds to a combination of the above-described processing when the setting value is "1" and the processing when the setting value is "2". That is, in FIG. 10, step ST33 corresponds to step ST13 in FIG. 8, and steps ST31 and ST34 correspond to steps ST21 and ST24 in FIG. 9.

As illustrated in FIG. 10, upon start of the task setting and execution processing when the setting value is "3", in step ST31, a value for the DMAC_IMMEDIATE register 13 is read from the SRAM 2, the read value is set in the DMAC_IMMEDIATE register 13, and the process proceeds to step ST32.

In addition, in step ST32, a value for the DMAC_DST register 12 is read from the SRAM 2, the read value is set in the DMAC_DST register 12, and the process proceeds to step ST33. In step ST33, the DMAC 1 sets the number of pieces of data in the DMAC_CONFIG register 11 to "1", and the process proceeds to step ST34. That is, when the setting value is "3", the DMAC 1 directly sets the number of pieces of data to "1" by specifying DMAC_CONFIG=0x0000_0001, without reading a setting value for the DMAC_CONFIG register 11 from the SRAM 2.

In step ST34, the value in the DMAC_IMMEDIATE register 13 is written to the DMAC_DST register 12. That is, since the value to be written to an address indicated by the DMAC_DST register 12 is the DMAC_IMMEDIATE register (shared with the DMAC_SRC register) 13, the process (step ST04 in FIG. 7) in which the value to be written is read via the bus 5 may be omitted. With the processing described above, compared with the above-described case in which the setting value is "0", the number of processes for reading a value from the memory 2 can be reduced by 2.

FIG. 11 is a table for describing an effect of reducing the number of accesses through the bus 5 in the DMA control device 1 in the first embodiment and illustrates rates of reduction in the number of accesses through bus 5 in the above-described cases in which the setting value is "0" to "3" (the setting bits=1 to 3).

As described above with reference to FIGS. 7 to 10 and FIG. 11, the number of write accesses through the bus 5 is 1 (step ST05, ST15, ST24, or ST34) in any of the cases in which the setting value is "0" to "3".

On the other hand, the number of read accesses through the bus 5 is 4 (steps ST01 to ST04) when the setting value is "0" and is 3 (steps ST11, ST12, and ST14) when the setting value is "1".

Also, the number of read accesses through the bus 5 is also 3 (steps ST21 to ST23) when the setting value is "2". In addition, the number of read accesses through the bus 5 is 2 (steps ST31 and ST32) when the setting value is "3". However, when the setting value is "1" to "3", it is important that an appropriate value be pre-set for the DMAC_SCATTER register 16 before the task setting and execution is started.

That is, as illustrated in FIG. 11, the number of accesses when the setting value is "1" or "2" is 4, and thus the rate of reduction (a reduction rate) is 20% of the number of accesses, 5, when the setting value is "0", and the number of accesses when the setting value is "3" is 3, and thus the rate of reduction is 40% of the number of accesses, 5, when the setting value is "0".

Thus, according to the DMA control device (DMA control method) in the present embodiment, it is possible to reduce the number of cycles performed in the DMA processing and it is possible to reduce the power consumption. FIG. 11 illustrates only the numbers of accesses through the bus 5, and for example, when the power consumption of the DMAC 1 and the CPU core 3 is considered, an advantage of the power consumption reduction which is obtained by applying the present embodiment become greater.

Figure 12:
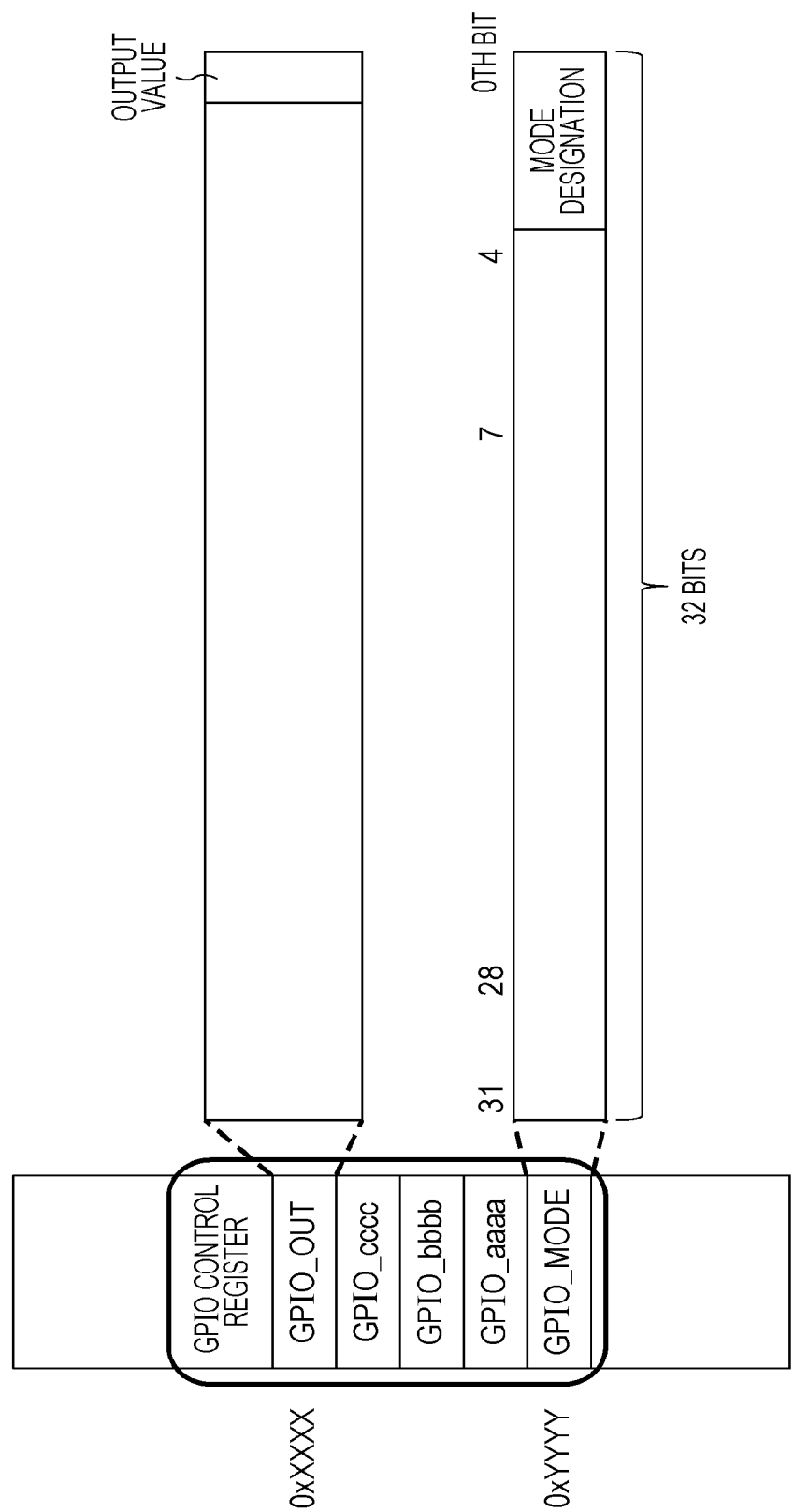
FIG. 12 is a diagram for describing an example operation of a peripheral.

FIG. 12 is a diagram for describing an example operation of a peripheral (peripheral circuit). Specifically, FIG. 12 illustrates a process in which a high level "H" ("1") is output from GPIO port #0 (corresponding to the GPIO port 41 in FIG. 1) through use of the scatter-gather mode.

In this case, it is assumed that, for example, "H" can be output from the GPIO port by writing "1" (=output mode) to the GPIO_MODE register and writing "1" (="H" output) to the GPIO_OUT register.

That is, in order to set a value to be output from GPIO port #0, "1" is written to 0 bit in the GPIO_OUT register. In addition, in order to put GPIO port #0 into an output mode, 4'h1 (in hexadecimal form, the setting bits=1) is written to [3:0] bits in the GPIO_MODE register.

Since addresses (0xXXXX and 0xYYYY) in control registers (the GPIO_OUT register and the GPIO_MODE register) in the peripheral which are to be set are not contiguous, setting for the GPIO_OUT register is executed by task #0, and setting for the GPIO_MODE register is executed by task #1 in the scatter-gather.

In this case, for example, the scatter-gather mode may be executed by handling, as task #0, a task for writing "1" to the GPIO_OUT register and handling, as task #1, a task for writing "1" to the GPIO_MODE register.

Since it has been known in advance that both tasks #0 and #1 are writing to respective addresses (that is, an address in the GPIO_OUT register and an address in the GPIO_MODE register) and the values to be written thereto are "1", tasks #0 and #1 may use an operation mode for the setting value "3".

As described above and illustrated in FIG. 3, for example, when the DMAC_SCATTER register 16 is 32 bits, and every 2 bits from the bottom bit indicates a setting value for one task, setting values for 16 tasks can be written by a single register-writing operation. This makes it possible to suppress an increase in the number of processing cycles involved in writing to the DMAC_SCATTER register 16.

As described above, according to the DMA control device 1 in the first embodiment, for example, register access for controlling the peripheral circuit 41 can be performed in a smaller number of processing cycles by using the DMAC 1, without operating the CPU core 3.

This makes it possible to perform processing using the DMAC 1 without operating the CPU core 3, which occupies a large ratio of the circuit scale of the MCU, and it is further possible to reduce the power consumption by reducing the operating time of the DMAC 1. These advantages are not limited to the first embodiment and are also obtained in each embodiment described below.

The DMA control device 1, the micro control unit, and the DMA control method in the present embodiment can also be applied to various types of electronic equipment. In particular, the present embodiment is thought to be effectively applied to MCUs and so on used in wireless sensor nodes that are desired to consume super-low power and that use devices (such as solar batteries, thermal electric generation devices, and vibration power generation devices) utilizing energy existing in the environment as energy sources.

FIG. 13 is a block diagram for describing a setting register configuration in a second embodiment in the DMA control device, and FIG. 14 is a table illustrating an example of the setting register configuration in the DMA control device 1 illustrated in FIG. 13.

As is apparent from comparison of FIG. 13 with FIG. 3, a DMA control device (DMAC) 1 in the second embodiment has a configuration that is similar to that of the first embodiment illustrated in FIG. 3. That is, the DMAC 1 in the second embodiment includes a configuration (DMAC_CONFIG) register 11, a destination-address (DMAC_DST) register 12, a source-address (DMAC_SRC) register 13, and so on as basic-function setting registers.

The DMAC 1 further includes a DMAC_TASK_NUM register 14 and a DMAC_TASK_ADDR register 15 as scatter-gather setting registers. The number of tasks to be executed is set in the DMAC_TASK_NUM register 14, and an address at which the contents of the basic-function setting registers for task #0 to be executed first are stored is set in the DMAC_TASK_ADDR register 15. The DMAC 1 further includes, as a scatter-gather setting register, a DMAC_SCATTER register 16 for switching between scatter-gather modes.

The DMAC_SCATTER register 16 in the DMAC 1 in the second embodiment illustrated in FIG. 13 is adapted such that, for example, 32 bits are assigned to ten tasks 16-0 to 16-9 for tasks #0 to #9 and eight values can be set with 3 bits for each task. The remaining 2 bits are unused bits.

With the DMAC_SCATTER register 16, each of operations on tasks to be sequentially executed in the scatter-gather is set using 3 bits, and details of processing in each task are changed based on the setting. That is, as illustrated in FIG. 14, six types of operation mode, that is, the setting bits=1 (the setting value is "0") to the setting bits=5 (the setting value is "5") can be set.

Although details of operations for the setting bits=6 and the setting bits=7 are "undefined" in FIG. 14, up to eight types of operation mode can be set if operation modes are set for these setting bits.

Also, in a fourth embodiment described below with reference to FIG. 21, operations for tasks to be sequentially executed in the scatter-gather are each set using 4 bits (up to 16 types of operation mode), and the number of bits to be assigned may be changed to an arbitrary value. Moreover, although the bit width is 32 bits by way of example, it may be 64 bits or the like.

As illustrated in FIG. 14, for the six types of scatter-gather operation mode performed by the DMAC 1 in the second embodiment, for example, operation modes when the setting value is "4" and "5" are set in addition to the four types of operation mode (the setting value is "0" to "3") described above with reference to FIG. 6.

That is, as illustrated in FIG. 14, when the value (setting value) of the setting bits is "4", the DMAC 1 does not read a setting value for the DMAC_CONFIG register 11 from the SRAM 2, and for example, the DMAC 1 directly specifies DMAC_CONFIG=0x0000_0001 and sets all values to be written to "0".

Also, when the value (setting value) of the setting bits is "5", the DMAC 1 does not read a setting value for the DMAC_CONFIG register 11 from the SRAM 2, and for example, the DMAC 1 directly specifies DMAC_CONFIG=0x0000_0001 and sets all values to be written to "1".

As described above, the DMA control device in the second embodiment is adapted such that, for example, tasks to be executed in the scatter-gather mode have six operation modes (the setting values "0" to "5") and operation modes can be respectively set for ten tasks #0 to #9.

Figure 15:
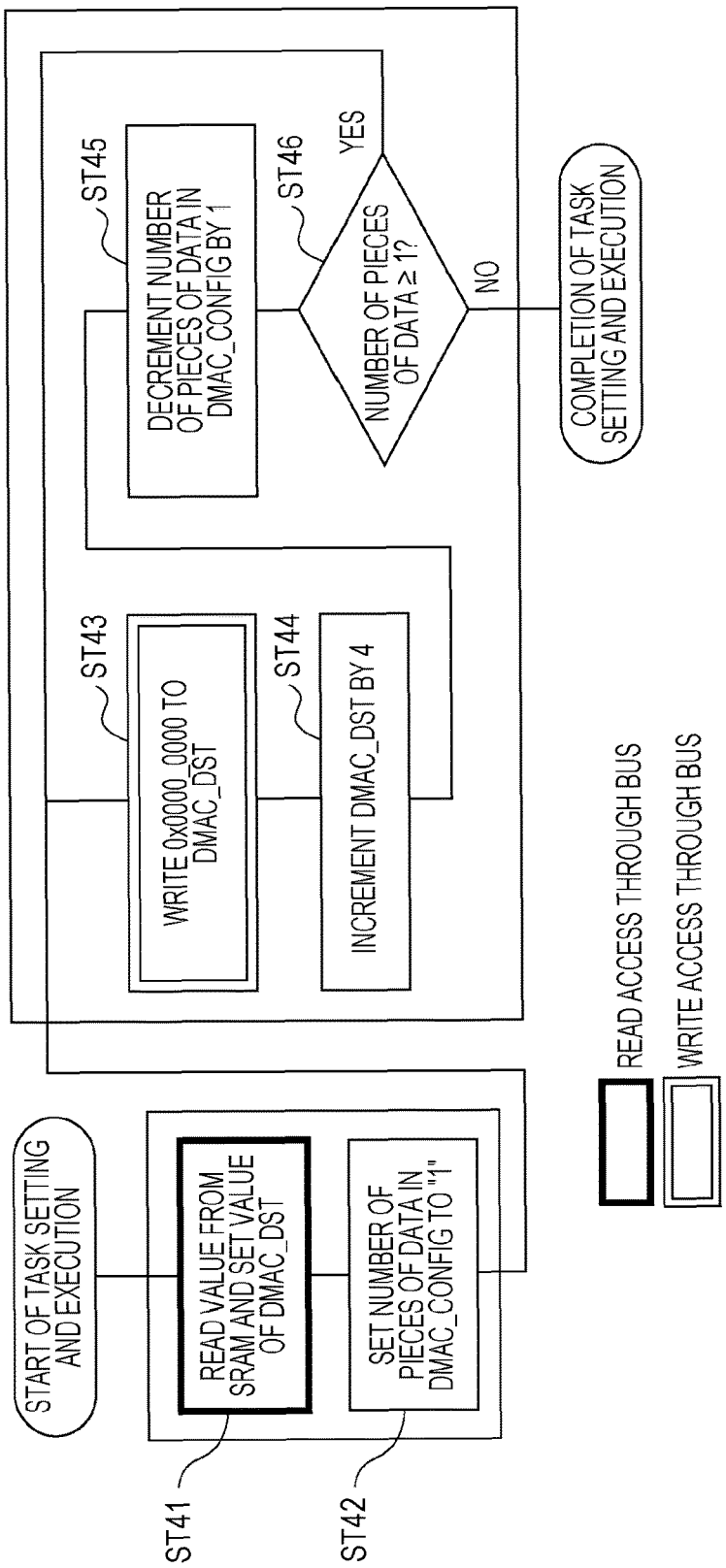
FIG. 15 is a flowchart illustrating an example operation for setting bits=4 in the setting register configuration illustrated in FIG. 14.

FIG. 15 is a flowchart illustrating an example operation for the setting bits=4 (the setting value is "4") in the setting register configuration illustrated in FIG. 14. As is apparent from comparison of FIG. 15 with FIG. 10, when the setting value is "4", the process in step ST31 in FIG. 10 is omitted.

That is, in the operation mode when the setting value is "4", the DMAC 1 directly specifies DMAC_CONFIG=0x0000_0001 in step ST42 and further writes 0x0000_0000 to the DMAC_DST register 12 in step ST43.

That is, instead of writing the value in the DMAC_IMMEDIATE register 13 to the DMAC_DST register 12 in step ST34 in FIG. 10, the processing in FIG. 15 is adapted such that, in step ST43, 0x0000_0000 is written to the DMAC_DST register 12.

The processes in steps ST41, ST42, and ST44 to ST46 in FIG. 15 are the same as or similar to those in steps ST32, ST33, and ST35 to ST37 in FIG. 10, and descriptions thereof are not given hereinafter.

Thus, in the operation mode (illustrated in FIG. 15) when the setting value is "4", since the value to be written is pre-determined to be 0x0000_0000, it is possible to omit the operation for reading the setting value for the DMAC_CONFIG register 11 from the SRAM 2, compared with the operation mode (illustrated in FIG. 10) when the setting value is "3".

Compared with the case (described above with reference to FIG. 10) when the setting value is "3", the number of processes for reading a value from the memory 2 (the number of accesses through the bus 5) can be further reduced by 1. That is, compared with the above-described case in which the setting value is "0", the number of processes for reading a value from the memory 2 can be reduced by 3.

Figure 16:
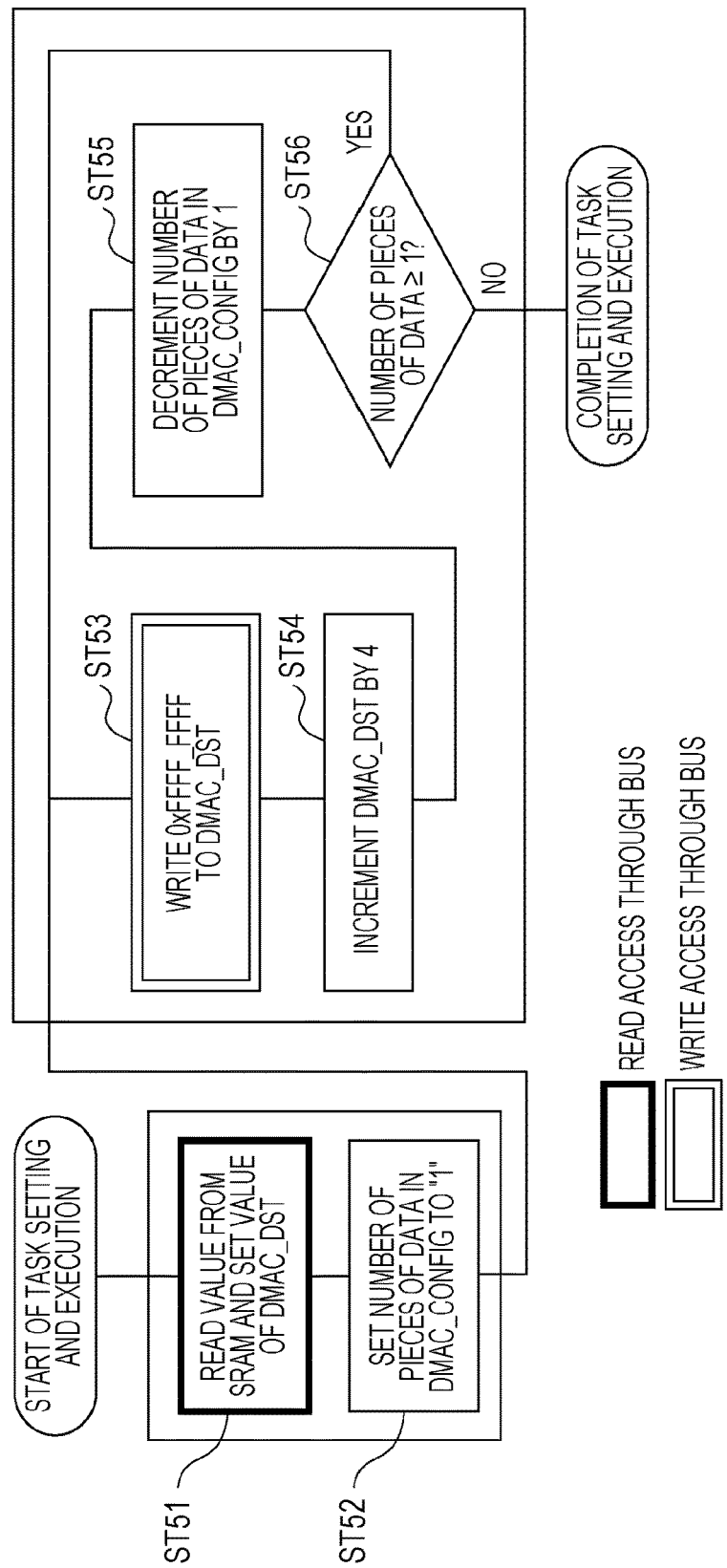
FIG. 16 is a flowchart illustrating an example operation for the setting bits=5 in the setting register configuration illustrated in FIG. 14.

FIG. 16 is a flowchart illustrating an example operation for the setting bits=5 (the setting value is "5") in the setting register configuration illustrated in FIG. 14. As is apparent from comparison of FIG. 16 with FIG. 15, when the setting value is "5", the process in step ST43 in FIG. 15 is replaced with step ST53.

That is, in the operation mode when the setting value is "5", instead of writing 0x0000_0000 to the DMAC_DST register 12 in step ST43 in FIG. 15, 0xFFFF_FFFF is written to the DMAC_DST register 12 in step ST53.

The processes in steps ST51, ST52, and ST54 to ST56 in FIG. 16 are the same as or similar to those in steps ST41, ST42, and ST44 to ST46 described above and illustrated in FIG. 15.

That is, in the operation mode (illustrated in FIG. 16) when the setting value is "5" is analogous to the operation mode (illustrated in FIG. 15) when the setting value is "4", except for the process for writing 0x0000_0000 to the DMAC_DST register 12 in step ST43 in the operation mode when the setting value is "4".

With this arrangement, compared with the case (described above with reference to FIG. 10) in which the setting value is "3", the number of processes for reading a value from the memory 2 (the number of accesses through the bus 5) can be further reduced by 1. That is, compared with the above-described case in which the setting value is "0", the number of processes for reading a value from the memory 2 can be reduced by 3.

In the above-described processing, for example, a mode for giving an instruction for returning the position of the setting bits for a next task to be executed to an initial position in the DMAC_SCATTER register 16 may also be provided for the setting bits=7 (the setting value is "7").

Figures 17, 18:
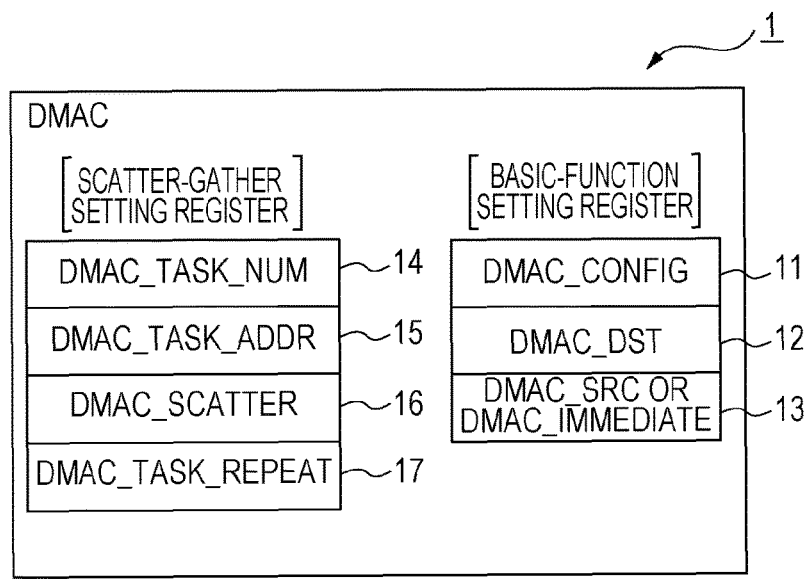
FIG. 17 is a table for describing an effect of reduction in the number of accesses through a bus in the DMA control device in the second embodiment.
FIG. 18 is a block diagram illustrating a setting register configuration in a third embodiment in the DMA control device.

FIG. 17 is a table for describing an effect of reduction in the number of accesses through the bus 5 in the DMA control device in the second embodiment and illustrates a rate of reduction in the number of accesses through the bus 5 in the above-described case in which the setting value is "0" to "5" (the setting bits=1 to 5). That is, FIG. 17 illustrates cases including cases in which the setting value is "4" and "5" in addition to the cases (described above and illustrated in FIG. 11) in which the setting value is "0" to "3".

As described above with reference to FIGS. 15 and 16 and FIG. 17, the number of write accesses through the bus 5 is 2 (steps ST41 and ST43 and steps ST51 and ST53) in either of the cases in which the setting value is "4" and "5".

That is, the number of read accesses through the bus 5 is 4 (steps ST01 to ST04) when the setting value is "0", whereas the number of read accesses through the bus 5 is 2 when the setting value is "4" and "5", and thus the rate of reduction in the number of accesses is 60%. Thus, it can be understood that the DMA control device 1 (the DMA control method) in the second embodiment can further reduce the number of cycles used for the DMA processing and can reduce the power consumption.

FIG. 18 is a block diagram illustrating a setting register configuration in a third embodiment in the DMA control device. As is apparent from comparison of FIG. 18 with FIG. 3, a DMA control device (DMAC) 1 in the third embodiment includes a task-repeat (DMAC_TASK_REPEAT) register 17 (a second register). The DMAC_TASK_REPEAT register 17 is a register for specifying how many times a series of tasks, the number of which is specified by the DMAC_TASK_NUM register 14, is continuously executed.

Figure 19:
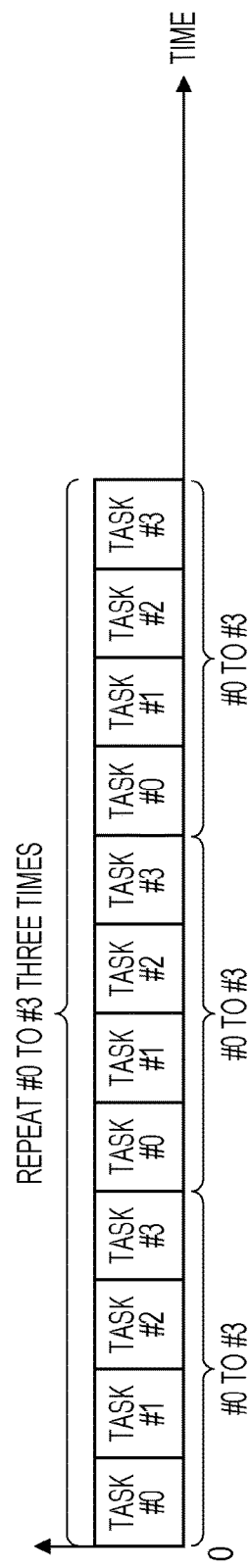
FIG. 19 is a diagram (part 1) for describing an operation of the DMA control device illustrated in FIG. 18.

FIGS. 19 and 20 are diagrams for describing the operation of the DMA control device 1 illustrated in FIG. 18. FIG. 19 is a diagram illustrating the number of and the order of tasks to be executed when DMAC_TASK_NUM=4 and DMAC_TASK_REPEAT=3 are specified for the DMAC_TASK_NUM register 14 and the DMAC_TASK_REPEAT register 17, respectively.

FIG. 20 illustrates from which positions in the memory 2 the values for the corresponding basic-function setting registers (the DMAC_CONFIG register 11, the DMAC_DST register 12, and the DMAC_SRC or DMAC_IMMEDIATE register 13), the values being set before each task is executed in this case, are read.

As illustrated in FIG. 19, since DMAC_TASK_NUM=4 is specified for the DMAC_TASK_NUM register 14, four tasks, that is, tasks #0, #1, #2, and #3, are executed, and the sequence thereof is repeated three times that is set in the DMAC_TASK_REPEAT register 17.

In this case, the values set for the basic-function setting registers 11 to 13 before each task is executed are read from the memory 2, as illustrated in FIG. 20. More specifically, a setting value "Src addr" (the DMAC_SRC or DMAC_IMMEDIATE register 13) for task #0 is read from 0x2000_0000, a setting value "Dst addr" (the DMAC_DST register 12) for task #0 is read from 0x2000_0004, and a setting value "config" (the DMAC_CONFIG register 11) for task #0 is read from 0x2000_0008.

Also, a setting value "Src addr" for task #1 is read from 0x2000_000C, a setting value "Dst addr" for task #1 is read from 0x2000_0010, and a setting value "config" for task #1 is read from 0x2000_0014. In addition, a setting value "Src addr" for task #2 is read from 0x2000_0018, a setting value "Dst addr" for task #2 is read from 0x2000_001C, and a setting value "config" for task #2 is read from 0x2000_0020. A setting value "Src addr" for task #3 is read from 0x2000_0024, a setting value "Dst addr" for task #3 is read from 0x2000_0028, and a setting value "config" for task #3 is read from 0x2000_002C.

Thus, according to the DMA control device 1 in the third embodiment, the provision of the DMAC_TASK_REPEAT register 17 allows the series of tasks #0 to #3 specified by the DMAC_TASK_NUM register 14 to be repeatedly executed a number of times that is set in the DMAC_TASK_REPEAT register 17.

Figure 21:
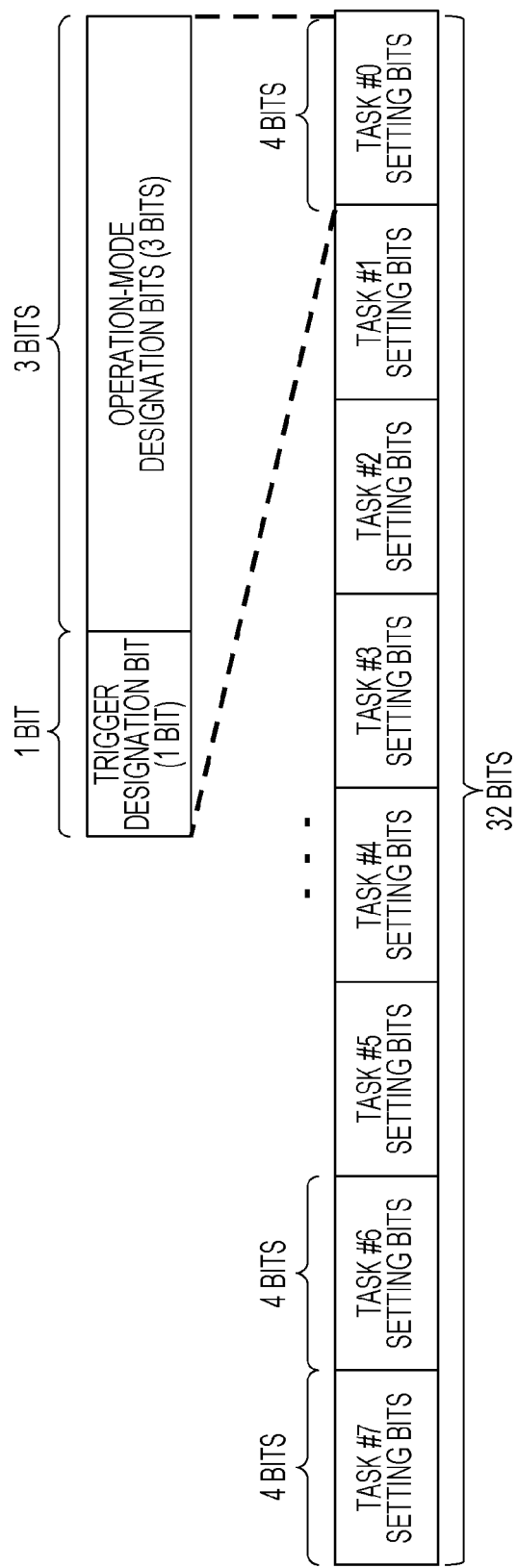
FIG. 21 is a diagram for describing a DMAC_SCATTER register in a setting register configuration in a fourth embodiment in the DMA control device.

FIG. 21 is a diagram for describing the DMAC_SCATTER register 16 in the setting register configuration in the fourth embodiment in the DMA control device 1. As illustrated in FIG. 21, the setting bits for tasks #0 to #7 are 4 bits, and operation-mode designation bits for each task (for example, #0) are 3 bits (corresponding to, for example, the values 0 to 7 of the setting bits illustrated in FIG. 14). In addition, a trigger designation bit for each task (a bit for designating the type of trigger for starting execution of the task) is 1 bit.

Meanwhile, for MCUs for built-in equipment which have been developed in recent years, a method other than a method in which the CPU core 3 performs writing to a register, provided in the DMAC 1, for giving an instruction for task execution is prepared as a method for triggering task execution by using the DMAC 1.

That is, MCUs in recent years have a function by which peripheral circuits, such as an SPI 40, a GPIO port 41, a timer 42, and an ADC 43, output trigger signals to the DMAC 1, in addition to the function by which the CPU core 3 performs writing to a register, provided in the DMAC 1, for giving an instruction.

More specifically, for example, the SPI 40 outputs a trigger signal when data transmission or reception is completed, and the GPIO port 41 outputs a trigger signal when the signal level of an input signal varies.

In addition, the timer 42 outputs a trigger signal when a counter value reaches a predetermined value, and the ADC 43 outputs a trigger signal when conversion of an analog signal input from an ADC I/F into a digital value is completed.

FIG. 22 has tables for describing an example of the setting register configuration illustrated in FIG. 21. As is apparent from comparison of FIG. 22 with FIG. 14, in the fourth embodiment, values 0 to 7 (bottom 3 bits) of the setting bits for tasks #0 to #7 specify operations that are analogous to those of the setting bits 0 to 7 (3 bits) in the second embodiment illustrated in FIG. 14.

Also, in the fourth embodiment, the top 1 bit of the setting bits for each of tasks #0 to #7 is used for specifying the type of trigger for starting task execution. For example, when the value of the setting bits (the top 1 bit) is 0, the time when a previous task is completed is specified for the task start trigger. Also, for example, when the value of the setting bits (the top 1 bit) is 0, the time when the DMAC 1 receives a trigger signal from a peripheral circuit is specified for the task start trigger.

Figure 23:
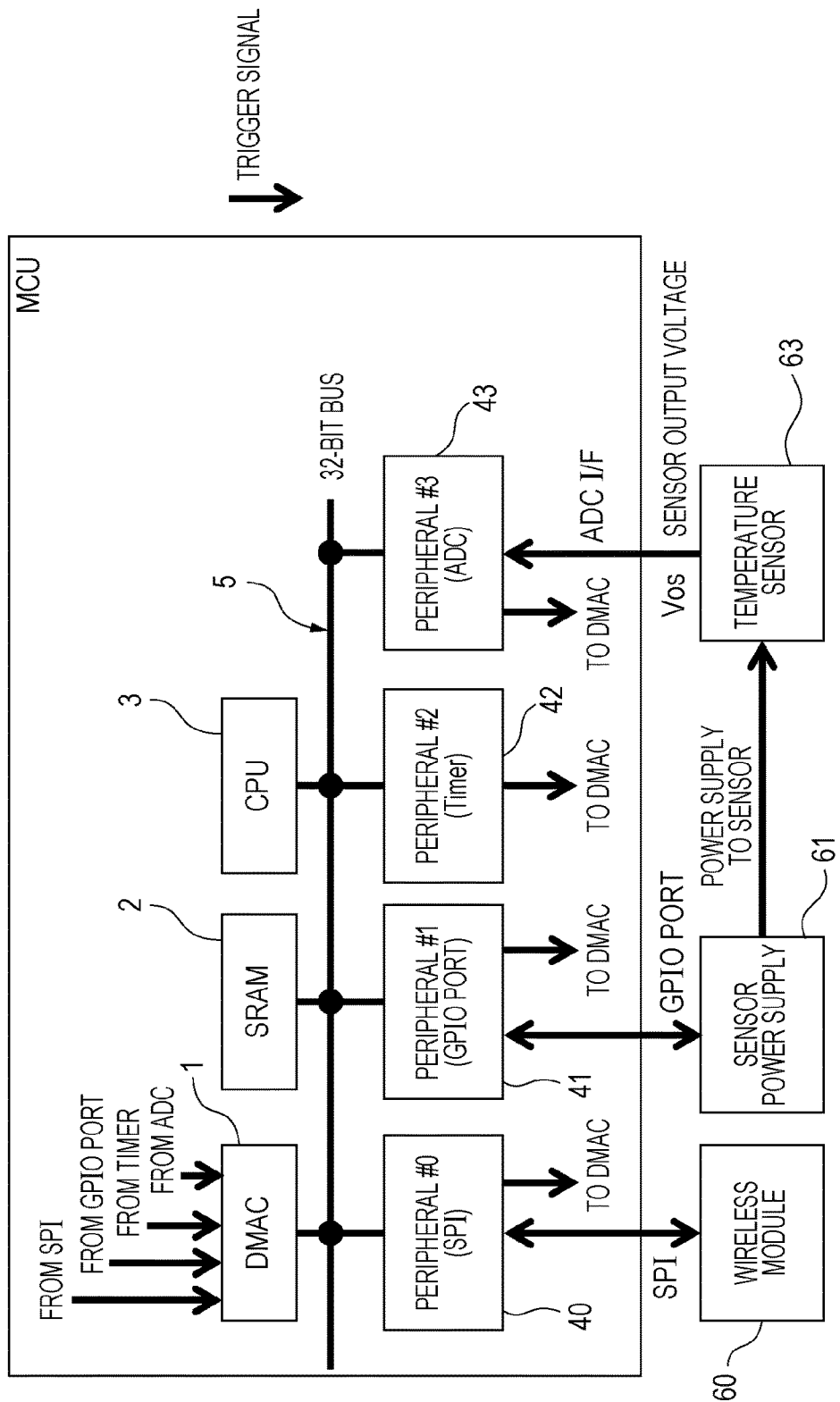
FIG. 23 is a block diagram illustrating an example of a wireless sensor node to which the DMA control device in the present embodiment is applied.

FIG. 23 is a block diagram illustrating an example of a wireless sensor node to which the DMA control device 1 in the present embodiment is applied. As illustrated in FIG. 23, the wireless sensor node (a wireless terminal) includes an MCU (microcontroller), an external wireless module 60, a sensor power supply 61, and a temperature sensor 63.

The MCU is similar to that described above and illustrated in FIG. 1. The MCU includes a DMAC 1, a memory 2, a CPU 3, an SPI 40, a GPIO port 41, a timer 42, and an ADC 43, which are connected to each other through a bus 5. The MCU is adapted such that trigger signals are input from the peripheral circuits (the SPI 40, the GPIO port 41, the timer 42, and the ADC 43) to the DMAC 1.

A processing operation in which a sensor output voltage Vos from a temperature sensor 63 is converted into a digital value at certain intervals and the digital value is output to the external wireless module 60 via the SPI 40, without using the CPU 3, will now be described with reference to FIG. 23.

The SPI 40 is connected to, for example, the wireless module 60, which has a wireless communication function, and, for example, the wireless module 60 wirelessly transmits data received via the SPI 40 to a server.

The sensor power supply 61 receives, for example, an input signal (high level "H"=a power-supply voltage of the MCU or low level "L"=a ground voltage of the MCU) from the GPIO port 41 in the MCU. The sensor power supply 61 supplies power to the temperature sensor 63 when the input signal has the high level "H" and does not supply power thereto when the input signal has the low level "L". While receiving the power supplied from the sensor power supply 61, the temperature sensor 63 measures the ambient temperature and outputs the measured temperature to the ADC 43 as an analog sensor voltage Vos.

Individual setting registers related to control and operations of the SPI 40, the GPIO port 41, the timer 42, and the ADC 43 are appropriately set in advance. In this case, the SPI 40 starts data transmission, for example, by writing data desired to be transmitted to a transmission-data register provided in the SPI 140.

For example, the GPIO port 41 outputs "H" when "1" is written to a GPIO_OUT register provided in the GPIO port 41 and outputs "L" when "0" is written to the GPIO_OUT register. In addition, the ADC 43 starts an analog-to-digital conversion operation, for example, by writing "1" to a START register provided in the ADC 43.

Figure 24:
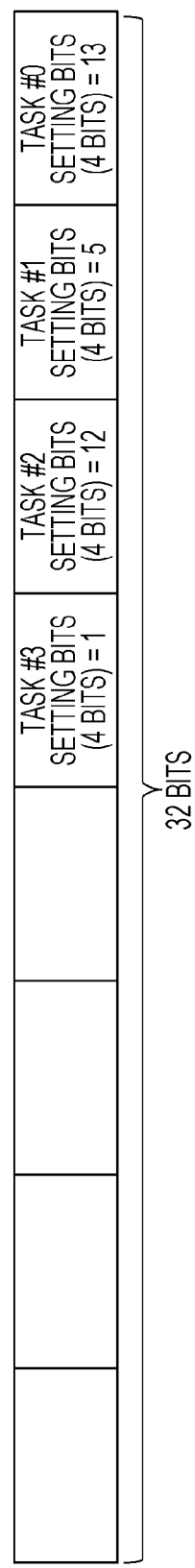
FIG. 24 is a diagram for describing an example of setting of a DMAC_SCATTER register, which is a scatter-gather setting register, in the wireless sensor node illustrated in FIG. 23.

FIG. 24 is a diagram for describing an example of setting of the DMAC_SCATTER register 16, which is a scatter-gather setting register, in the wireless sensor node (the DMAC 1) in FIG. 23. Setting bits (4 bits) for task #0=13, setting bits for task #1=5, setting bits for task #2=12, and setting bits for task #3=1 are set, as illustrated in FIG. 24. It is assumed that DMAC_TASK_NUM=4 is set for the DMAC_TASK_NUM register 14.

Figure 25:
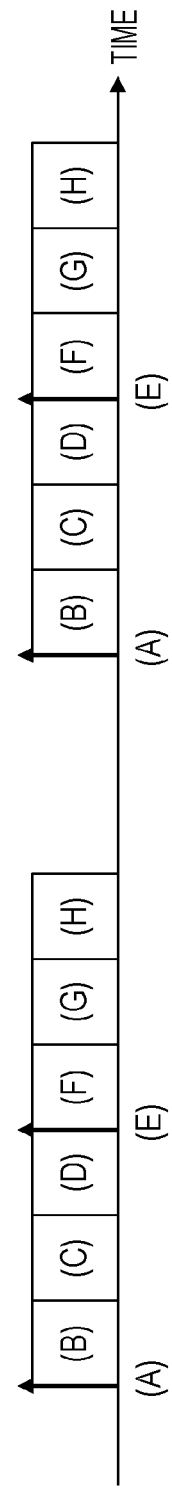
FIG. 25 is a diagram for describing an example operation of the wireless sensor node illustrated in FIG. 23.

FIG. 25 is a diagram for describing an example operation of the wireless sensor node illustrated in FIG. 23. An overview of FIG. 25 will now be described. First, in (A), the timer 42 outputs a trigger signal to the DMAC 1, and in (B), the DMAC 1 writes "1" to the GPIO_OUT register in the GPIO port 41 (task #0).

Next, in (C), the DMAC 1 writes "1" to the START register in the ADC 43 (task #1), and in (D), the ADC 43 converts a sensor output voltage Vos from the temperature sensor 63 into a digital value. In addition, in (E), the ADC 43 outputs a trigger signal to the DMAC 1, and in (F), the DMAC 1 writes "0" to the GPIO_OUT register in the GPIO port 41 (task #2).

In (G), the DMAC 1 reads the digital value in the ADC 43 and writes the read digital value (data) to the transmission-data register in the SPI 40 (task #3), and in (H), the SPI 40 outputs the data.

That is, in (A), the timer 42 outputs a trigger signal to the DMAC 1 at certain intervals. In addition, in (B), the DMAC 1 that has received the trigger signal from the timer 42 checks whether or not the top 1 bit of the setting bits for task #0 is "1".

Since the top 1 bit for task #0 is "1", as illustrated in FIG. 24, the DMAC 1 starts task execution in response to the trigger signal 1, to read values at 0x2000_0000 to 0x2000_0008 allocated to the SRAM (memory) 2. The DMAC 1 then writes the read values to the basic-function setting registers 11 to 13.

When the processing for writing the values to the basic-function setting registers 11 to 13 is finished, task #0 is executed, that is, "1" is written to the GPIO_OUT register in the GPIO port 41, in accordance with the values in the basic-function setting registers 11 to 13.

In addition, the GPIO port 41 in which "1" is written to the GPIO_OUT register sets an output signal to "H". Upon receiving this "H" signal, the sensor power supply 61 starts power supply to the temperature sensor 63. The temperature sensor 63 to which power is supplied measures the ambient temperature and outputs a sensor output voltage Vos as an analog voltage.

The DMAC 1 that has completed task #0 in (C) checks whether or not the top 1 bit of the setting bits for task #1 is "1". As illustrated in FIG. 24, the top 1 bit for task #1 is "0". Thus, the DMAC 1 starts execution of a next task upon completion of the previous task, to read the values at 0x2000_000C to 0x2000_0014 allocated to the SRAM 2 and write the read values to the basic-function setting registers 11 to 13. After this writing processing is completed, task #1 is executed, that is, "1" is written to the START register in the ADC 43, in accordance with the values in the basic-function setting registers 11 to 13.

Upon completing task #1, the DMAC 1 checks whether or not the top 1 bit of the setting bits for task #2 is "1". Since the top 1 bit for task #2 is "1", as illustrated in FIG. 24, the DMAC 1 receives a trigger signal, which is an execution start signal, for task #2.

In addition, in (D), the ADC 43 in which "1" is written to the START register converts the analog input voltage Vos into a digital value and writes the converted value to a data register. In (E), the ADC 43 outputs a trigger signal to the DMAC 1.

Next, in (F), the DMAC 1 that has received the trigger signal from the ADC 43 checks whether or not the top 1 bit of the setting bits for task #2 is "1". As illustrated in FIG. 24, the top 1 bit for task #2 is "1". Thus, the DMAC 1 starts task execution upon receiving the trigger signal, to read the values at 0x2000_0018 to 0x2000_0020 allocated to the SRAM 2 and write the read values to the basic-function setting registers 11 to 13.

After the writing processing is finished, task #2 is executed, that is, "0" is written to the GPIO_OUT register in the GPIO port 41, in accordance with the values in the basic-function setting registers 11 to 13. The GPIO port 41 in which "0" is written to the GPIO_OUT register sets an output signal to "L". Upon receiving the "L" signal, the sensor power supply 61 stops power supply to the temperature sensor 63.

In addition, in (G), the DMAC 1 that has completed task #2 checks whether or not the top 1 bit of the setting bits for task #3 is "1". As illustrated in FIG. 24, the top 1 bit for task #3 is "0". Thus, the DMAC 1 starts execution of a next task upon completion of the previous task, to read values at 0x20000024 to 0x2000_002C allocated to the SRAM 2 and write the read values to the basic-function setting registers 11 to 13. After the writing is finished, task #3 is executed, that is, the value in the data register in the ADC 43 is read and the read value is written to the transmission-data register in the SPI 40, in accordance with the values in the basic-function setting registers.

In this case, since DMAC_TASK_NUM=4 is specified to indicate that the number of tasks to be executed in the scatter-gather mode is 4, and four tasks, that is, tasks #0 to #3, have already been executed, the DMAC 1 determines that there is no next task to be executed and ends the operation.

In (H), the SPI 40 in which the value is written to the transmission-data register outputs the written value to the wireless module 60 as data. The wireless module 60 receives the data via an SPI thereof and transmits the received data to a server or the like through a wireless channel. The above-described series of processes (A) to (H) is performed at certain intervals, based on the trigger signal output from the timer 42.

FIG. 26 is a diagram illustrating an example of values to be read into the basic-function setting registers 11 to 13 in the DMA control device (DMAC 1) before each task stored in the SRAM (memory) 2 illustrated in FIG. 23 is executed.

In this case, tasks #0 and #1 operate in a mode specified by the setting bits=5 (the setting value is "5"), the setting bits being the bottom 3 bits of the setting bits described above with reference to FIG. 22. The operation mode when the setting value is "5" is substantially the same as that described above with reference to FIGS. 14 and 16.

Thus, any values may be set (don't care) at 0x2000_0000, 0x2000_0008, 0x2000_000C, and 0x2000_0014 set in the Src addr register (the DMAC_SRC or the DMAC_IMMEDIATE register 13) and the config register (the DMAC_CONFIG register 11).

In this case, the values in the GPIO_OUT register (for example, Dst addr (the DMAC_DST register 12) for task #0) and the START register (for example, Dst addr (the DMAC_DST register 12) for task #1), which are write destination addresses, are set in 0x2000_0004 and 0x2000_0010, respectively.

Also, task #2 operates in a mode specified by the setting bits=4 (the setting value is "4"), the setting bits being the bottom 3 bits of the setting bits described above and illustrated in FIG. 22. The operation mode when the setting value is "4" is substantially the same as that described above with reference to FIGS. 14 and 15.

Thus, any values may be set (don't care) at 0x2000_0018 and 0x2000_0020 set in the Src addr register (13) and the config register (11). In this case, the value in the GPIO_OUT register (12), which is a write destination address, is set at 0x2000_001C.

In addition, task #3 operates in a mode specified by the setting bits=1 (the setting value is "1"), the setting bits being the bottom 3 bits of the setting bits described above and illustrated in FIG. 22. The operation mode when the setting value is "1" is substantially the same as that described above with reference to FIGS. 6 and 8.

Thus, any value may be set (don't care) at 0x2000_002C set in the config register (11). In this case, the value in the data register in the ADC 43, the value being a read-destination address, and the value in the transmission-data register in the SPI 40, the value being a write-destination address, are set at 0x2000_0024 and 0x2000_0028, respectively.

The above-described operation realizes a function of a wireless sensor node that obtains the value of the temperature sensor 63 through use of the DMAC 1 and that transmits the value to a server through a wireless channel. Reading values from and writing values to the above-described registers may be performed, for example, using the CPU 3. In such a case, however, the power consumption becomes larger than a case in which the reading and the writing are performed using the DMAC 1, since the CPU 3 has a larger circuit scale than the DMAC 1.

Also, since a program to be executed by the CPU 3 is read from, for example, the SRAM 2, the number of accesses through the bus 5 also increases, and thus the power consumption also becomes larger than a case in which the reading and the writing are performed using the DMAC 1.

In addition, compared with a case in which the writing and reading are performed using a DMAC having the same scatter-gather mode, the present embodiment makes it possible to reduce the number of processing cycles for tasks by up to 60%, as described above with reference to FIG. 17. That is, the present embodiment makes it possible to complete a process in a smaller number of processing cycles, that is, in a shorter period of time, and, moreover, makes it possible to reduce the power consumption.

Figure 27:
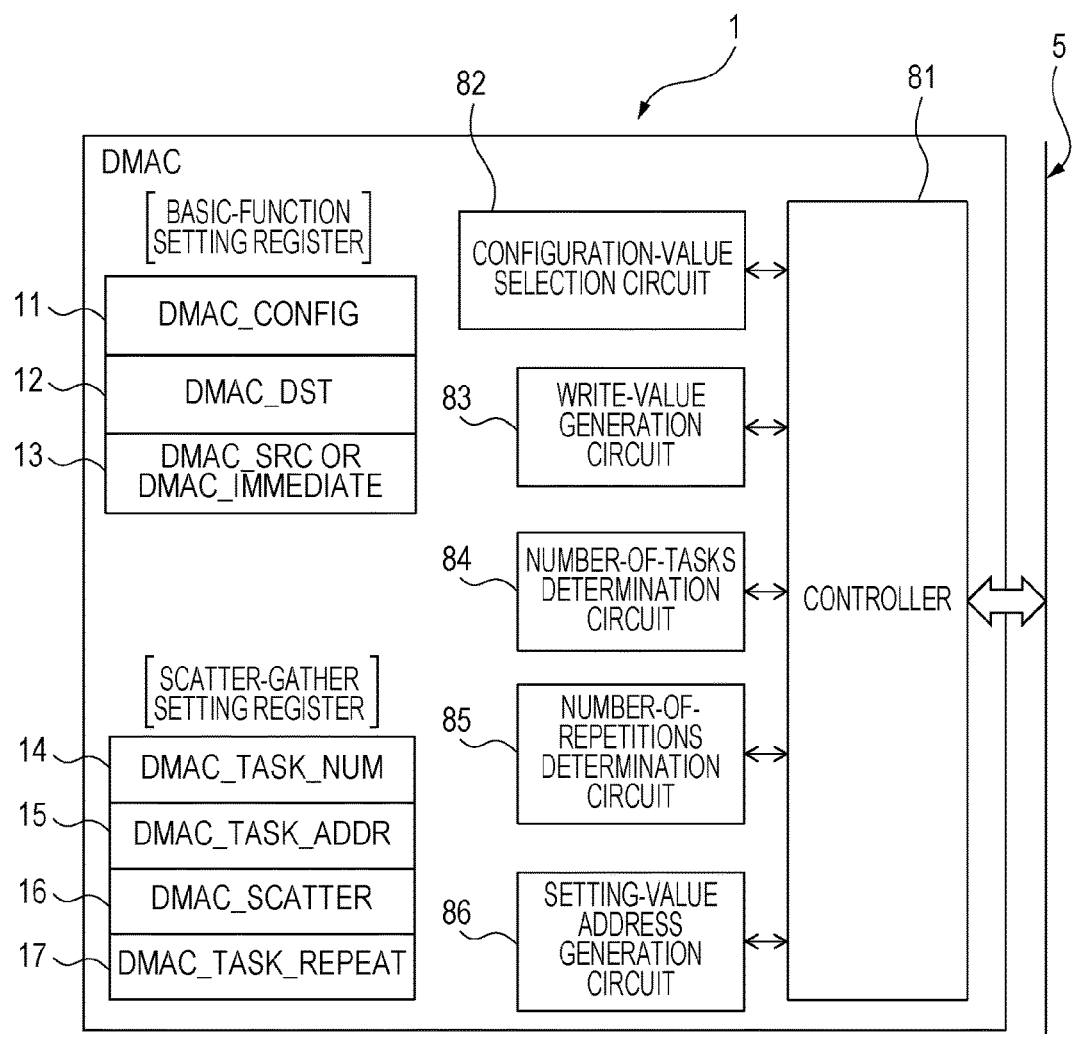
FIG. 27 is a block diagram illustrating an example of the DMA control device in the present embodiment.

FIG. 27 is a block diagram illustrating an example of the DMA control device 1 in the present embodiment. As illustrated in FIG. 27, the DMA control device (DMAC) 1 includes a controller 81, a configuration-value selection circuit 82, a write-value generation circuit 83, a number-of-tasks determination circuit 84, a number-of-repetitions determination circuit 85, and a setting-value address generation circuit 86.

The configuration-value selection circuit 82, the write-value generation circuit 83, the number-of-tasks determination circuit 84, the number-of-repetitions determination circuit 85, and the setting-value address generation circuit 86 are coupled to the bus 5 via the controller 81.

The DMAC 1 further includes, for example, basic-function setting registers and scatter-gather setting registers, as described above with reference to FIG. 18. The basic-function setting registers include a DMAC_CONFIG register 11, a DMAC_DST register 12, and a DMAC_SRC or DMAC_IMMEDIATE register 13. The scatter-gather setting registers include a DMAC_TASK_NUM register 14, a DMAC_TASK_ADDR register 15, a DMAC_SCATTER register 16 (a first register), and a DMAC_TASK_REPEAT register 17 (a second register).

In addition, the basic-function setting registers 11 to 13 and the scatter-gather setting registers 14 to 17 are connected to the controller 81, the configuration-value selection circuit 82, the write-value generation circuit 83, the number-of-tasks determination circuit 84, the number-of-repetitions determination circuit 85, and the setting-value address generation circuit 86, though the connections thereof are not illustrated. FIG. 27 illustrates merely an example of the DMAC 1, and it goes without saying that various changes and modifications can be made.

Figure 28:
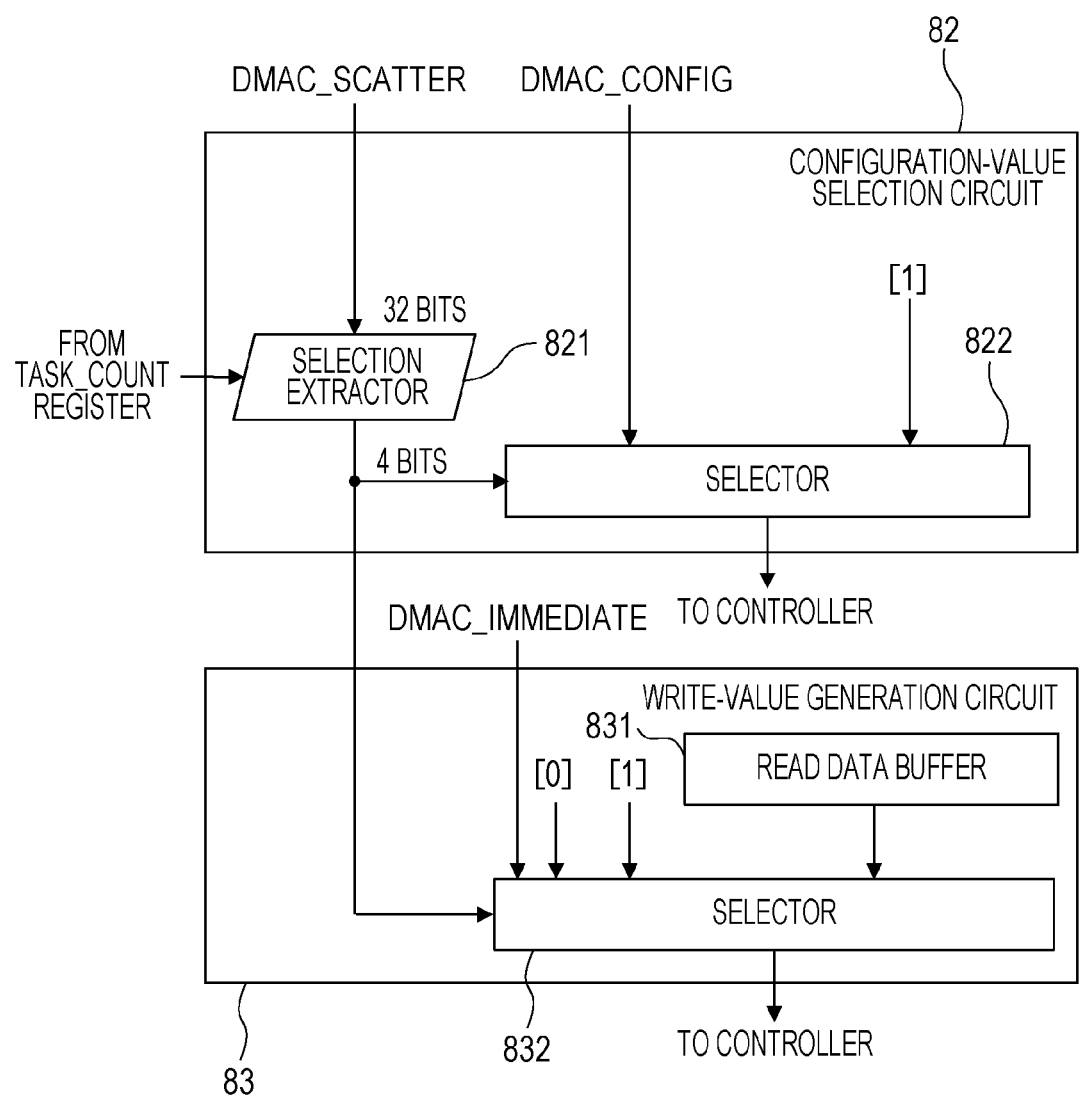
FIG. 28 is a block diagram illustrating an example of a configuration-value selection circuit and a write-value generation circuit in the DMA control device illustrated in FIG. 27.

FIG. 28 is a block diagram illustrating an example of the configuration-value selection circuit 82 and the write-value generation circuit 83 in the DMA control device 1 illustrated in FIG. 27. As illustrated in FIG. 28, the configuration-value selection circuit 82 includes a selection extractor 821 and a selector 822. The configuration-value selection circuit 82 generates a selection signal indicating whether a value output by the DMAC_SRC or DMAC_IMMEDIATE register 13 is to be used as the address in DMAC_SRC or the value in the DMAC_IMMEDIATE register.

The selection extractor 821 extracts, for example, 4 bits at the position, indicated by the task number of a task being currently executed, in the DMAC_SCATTER register 16, which is 32 bits, and outputs the extracted 4 bits. Based on the input 4-bit value, the selector 822 performs selection as to whether the number of values to be written by the DMAC 1 upon execution of one task is to be the value in the DMAC_CONFIG register 11 or "1".

For example, as described above with reference to FIG. 14, the selector 822 selects "1" when the input 4-bit value is "1", "3", "4" or "5", otherwise selects the value in the DMAC_CONFIG register 11, and outputs the selected value.

Also, the write-value generation circuit 83 includes a read data buffer 831 and a selector 832, as illustrated in FIG. 28, and generates, for example, a value that the DMAC 1 is to write to a copy-destination address. Based on the 4-bit value output from the configuration-value selection circuit 82 (the selection extractor 821), the selector 832 selects the value in the DMAC_IMMEDIATE register 13, "0", "1", or the value in the read data buffer 831.

For example, as described above with reference to FIG. 14, when the input 4-bit value is "0" or "1", the value in the read data buffer 831 is selected, and when the input 4-bit value is "2" or "3", the value in the DMAC_IMMEDIATE register 13 is selected. When the input 4-bit value is "4", "0" is selected, and when the input 4-bit value is "5", "1" is selected.

The controller 81 performs control so that data starting at an address set in the DMAC_SRC register 13, the number of pieces of the data being equal to the number set in the DMAC_CONFIG register 11, are stored in the read data buffer 831 through the bus 5 when the value of the setting bits is "0" or "1".

When the input 4-bit value is "0" or "1", the pieces of data, the number of which being equal to the number set in the DMAC_CONFIG register 11, are written to a memory space starting at an address set in the DMAC_DST register 12, to thereby execute the task.

Figure 29A:
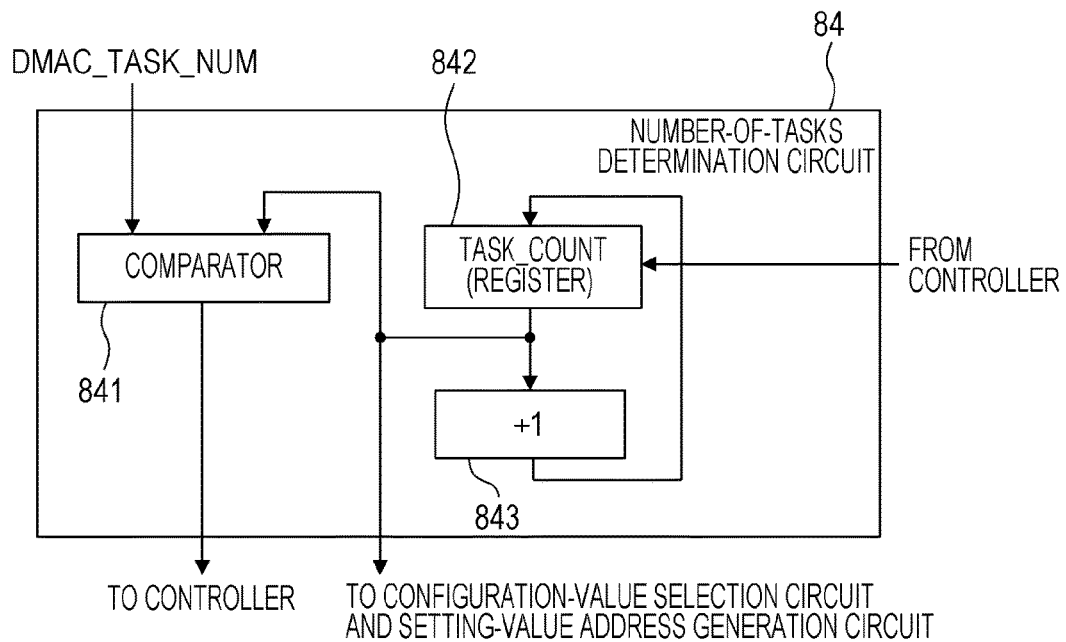
FIG. 29A is a block diagram illustrating an example of a number-of-tasks determination circuit in the DMA control device illustrated in FIG. 27.
Figure 29B:
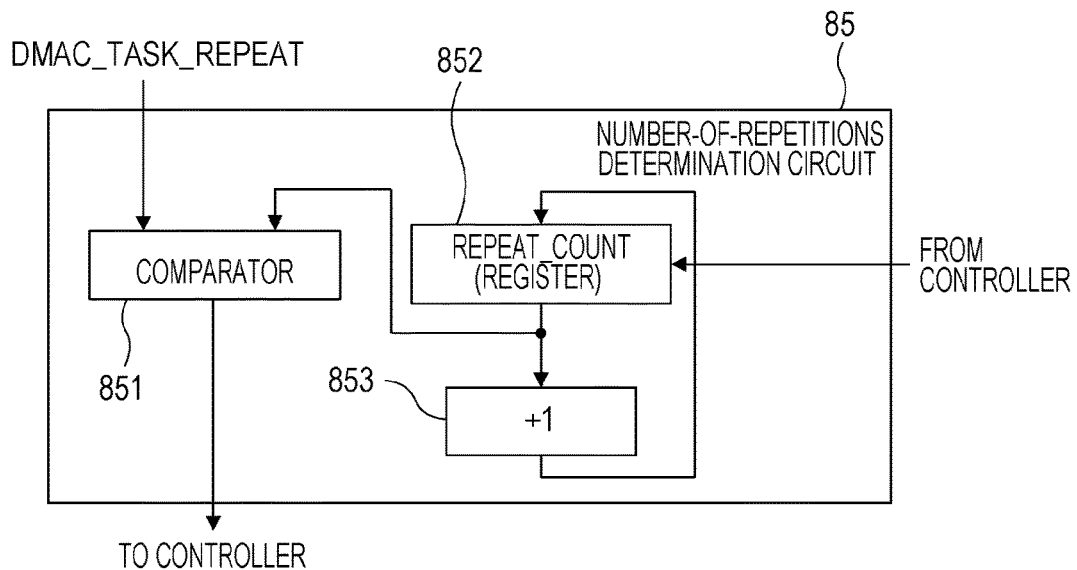
FIG. 29B is a block diagram illustrating an example of a number-of-repetitions determination circuit in the DMA control device illustrated in FIG. 27.

FIG. 29A is a block diagram illustrating an example of the number-of-tasks determination circuit 84 in the DMA control device 1 illustrated in FIG. 27, and FIG. 29B is a block diagram illustrating an example of the number-of-repetitions determination circuit 85 in the DMA control device 1 illustrated in FIG. 27.

As illustrated in FIG. 29A, the number-of-tasks determination circuit 84 includes a comparator 841, a TASK_COUNT register 842, and an incrementer 843. The number-of-tasks determination circuit 84 outputs a control signal indicating what number task is to be executed during execution of the scatter-gather modes (during the scatter-gather operation). When the TASK_COUNT register 842 receives a task completion notification from the controller 81, the incrementer 843 increments its value by 1.

The comparator 841 receives, from the DMAC_TASK_NUM register 14, the number of tasks to be executed in a single scatter-gather mode and compares the received number with a value in the TASK_COUNT register 842. When the two values are the same, the comparator 841 notifies the controller 81 that a desired number of tasks are completed.

As illustrated in FIG. 29B, the number-of-repetitions determination circuit 85 includes a comparator 851, a REPEAT_COUNT register 852, and an incrementer 853. The number-of-repetitions determination circuit 85 determines how many times execution of a series of tasks is repeated during execution of scatter-gather modes. The REPEAT_COUNT register 852 receives a series-of-task execution completion notification from the controller 81, and the incrementer 853 increments the value.

The comparator 851 receives a value in the DMAC_TASK_REPEAT register 17 and compares the received value with a value in the REPEAT_COUNT register 852. When the two values are the same, the comparator 851 notifies the controller 81 that the execution of the series of tasks corresponding to a desired number of repetitions is completed.

Figure 30:
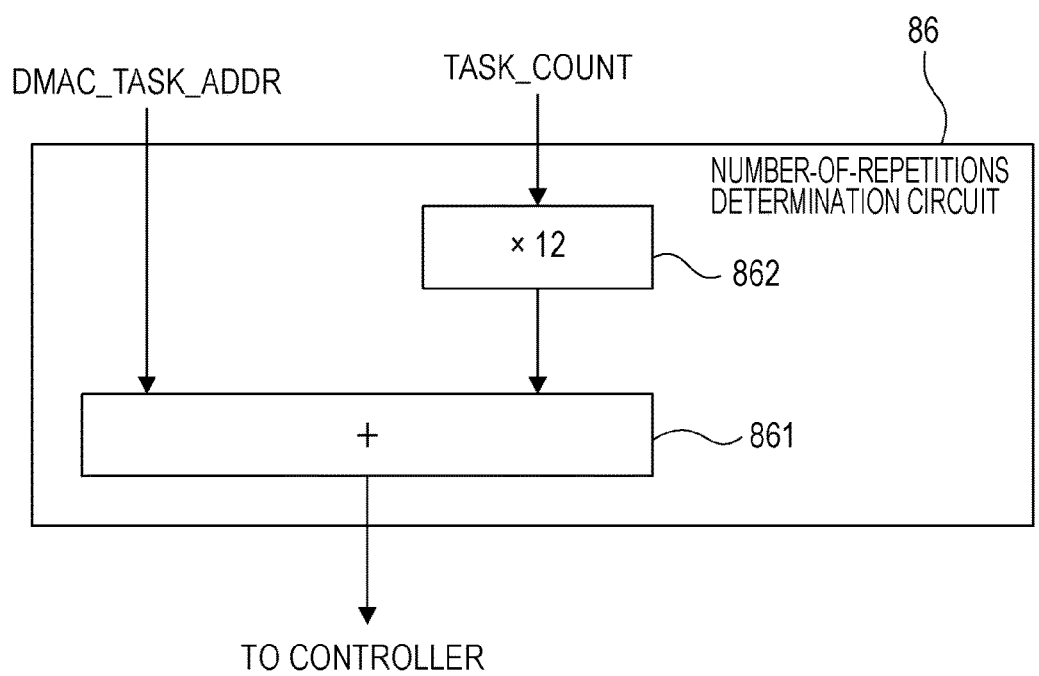
FIG. 30 is a block diagram illustrating an example of a setting-value address generation circuit in the DMA control device illustrated in FIG. 27.

FIG. 30 is a block diagram illustrating an example of the setting-value address generation circuit 86 in the DMA control device 1 illustrated in FIG. 27. As illustrated in FIG. 30, the setting-value address generation circuit 86 includes an adder 861 and a multiplier 862. The setting-value address generation circuit 86 issues, to the controller 81, a notification indicating at which addresses in the memory 2 values to be read into the basic-function setting registers are written, before a series of tasks is executed.

That is, the setting-value address generation circuit 86 issues, to the controller 81, at which addressees in the SRAM 2 values for the DMAC_SRC register 13, the DMAC_DST register 12, and the DMAC_CONFIG register 11 are written.

For example, an address at which the values for the basic-function setting registers used for executing task #0 are stored is stored in the DMAC_TASK_ADDR register 15. Now, a case in which the number of pieces of 32-bit data in the DMAC_SRC register 13, the DMAC_DST register 12, and the DMAC_CONFIG register 11 is 3 for a single task is considered specifically. In addition, it is assumed that the MCU provided with the DMAC 1 in the present embodiment employs a byte-addressing scheme (in which one address is assigned for every 8 bits).

In this case, values for the basic-function setting register for task #0 are stored at, for example, addresses included in the SRAM 2 and specified by n to n+11, where n represents an address stored in the DMAC_TASK_ADDR register 15.

Values for the basic-function setting registers for task #1n are stored at addresses specified by n+12 to n+23, and similarly, values for the basic-function setting registers for task #m are stored at addresses specified by n+12×m to n+12×(m+1)−1. Accordingly, the setting-value address generation circuit 86 outputs "address in the DMAC_TASK_ADDR register 15"+"value in the TASK_COUNT register 842"×12 to the controller 81.

The controller 81 controls writing values to and reading values from the basic-function setting registers 11 to 13 and the scatter-gather setting registers 14 to 17, the writing and reading being performed by the CPU 3 through the bus 5, and also controls the configuration-value selection circuit 82, the write-value generation circuit 83, the number-of-tasks determination circuit 84, the number-of-repetitions determination circuit 85, and the setting-value address generation circuit 86.

That is, upon receiving signals from the circuits 82 to 86, the controller 81 outputs, to the circuits 82 to 86, various control signals for executing one task or the scatter-gather mode. In addition, the controller 81 also controls data reading and writing through the bus 5, the reading and writing being performed during task execution.

Although some embodiments have been described above, all examples and conditions described herein are intended to facilitate understanding of the concepts of the present disclosure which are applied to the invention and technology, and are not particularly intended to limit the scope of the present disclosure. Also, such descriptions herein are not intended to indicate advantages and disadvantages of the present disclosure. Although the embodiments of the present disclosure have been described in detail, it is to be understood that various changes, substitutions, and modifications are possible without departing from the spirit and scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A direct memory access (DMA) control device comprising:
   a basic-function setting register used to perform DMA operation; and
   a scatter-gather setting register including a first register in which a value indicating one of a plurality of operation modes is set for each of a series of DMA tasks to change details of processing for the each task.

2. The DMA control device according to claim 1,
   wherein the basic-function setting register includes a configuration register in which a number of pieces of data to be transferred is specified; and
   the DMA control device further comprising a configuration-value selection circuit that selects, as a value to be written to the configuration register, either a value read out from a memory coupled to the DMA control device through a bus or a pre-defined value generated in the DMA control device, based on the value in the first register.

3. The DMA control device according to claim 1,
   wherein the basic-function setting register includes a source-address register in which a source address in a memory is set and a destination-address register in which a copy-destination address in the memory is set; and
   the plurality of operation modes includes a mode in which a value in the source address register is used as an immediate value to be written to the copy-destination address in the memory.

4. The DMA control device according to claim 1,
   wherein the scatter-gather setting register further includes a second register which specifies an address in a memory at which values to be set into the basic-function setting register for the series of DMA tasks are stored.

5. The DMA control device according to claim 4, wherein the scatter-gather setting register further includes a third register which specifies how many DMA tasks are included in the series of DMA tasks.

6. The DMA control device according to claim 5, further comprising:
a number-of-tasks determination circuit that receives a value in the third register and that determines how many tasks were executed during the scatter-gather operations.

7. The DMA control device according to claim 5, wherein the scatter-gather setting register further includes a fourth register which specifies how many times the series of DMA tasks is repeatedly performed.

8. The DMA control device according to claim 1, further comprising:
a number-of-repetition determination circuit that determines how many times the series of DMA tasks were repeatedly performed during the scatter-gather operations.

9. A micro control unit comprising:
the DMA control device according to claim 1;
a memory;
a central processing unit (CPU);
peripheral circuits; and
a bus that couples the DMA control device, the memory, the CPU, and the peripheral circuits.

10. A direct memory access (DMA) control method having a scatter-gather mode, the method comprising:
writing a setting value to a basic-function setting register for DMA operation,
wherein the scatter-gather mode includes a plurality of different modes, and each task of a series of DMA tasks is executed in a mode specified by a scatter-gather setting register in which one of the plurality of modes is specified for each task of the series of DMA tasks.

11. The DMA control method according to claim 10, wherein, in a first mode among the plurality of different modes, a configuration register, which is included in the basic-function setting register and specifies how many pieces of data are to be transferred, is set to a predefined value without being read from a memory through a bus.

12. The DMA control method according to claim 10, wherein, in a second mode among the plurality of different modes, a value in a source-address register included in the basic-function register is used as an immediate value to be written in a destination address of a memory indicated by a destination-address register included in the basic-function setting register.

13. The DMA control method according to claim 10, wherein, in a third mode among the plurality of different modes, a configuration register, which is included in the basic-function setting register and specifies how many pieces of data are to be transferred is set to a predefined value without being read from a memory through a bus, and a value in a source-address register included in the basic-function register is used as an immediate value to be written to a destination address indicated by a destination-address register included in the basic-function setting register.

14. The DMA control method according to claim 10, further comprising:
specifying how many tasks in the series of DMA tasks were executed.

15. The DMA control method according to claim 14, further comprising:
determining how many times the series of tasks was repeatedly performed.

* * * * *